United States Patent Office 2,795,087
Patented June 11, 1957

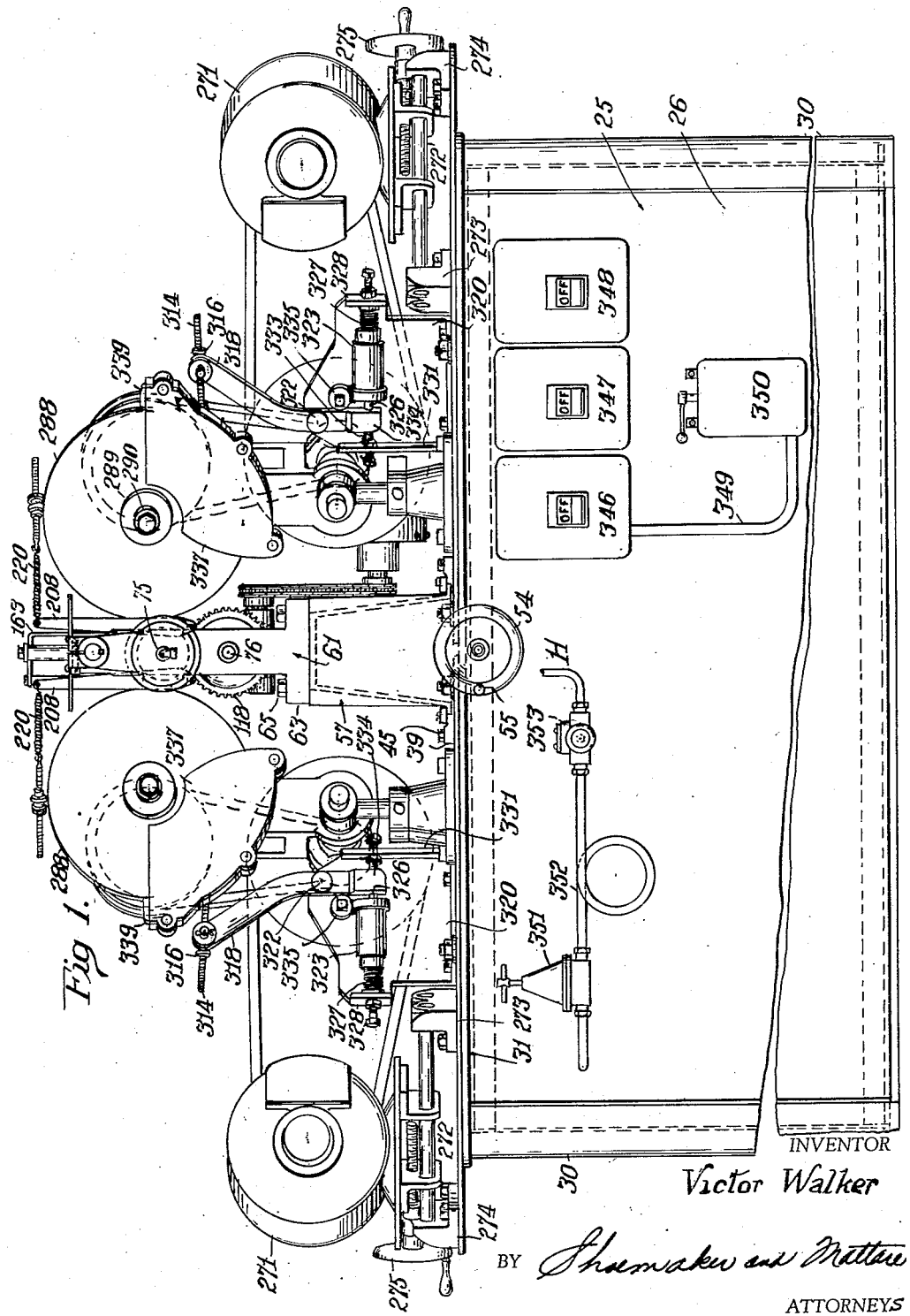

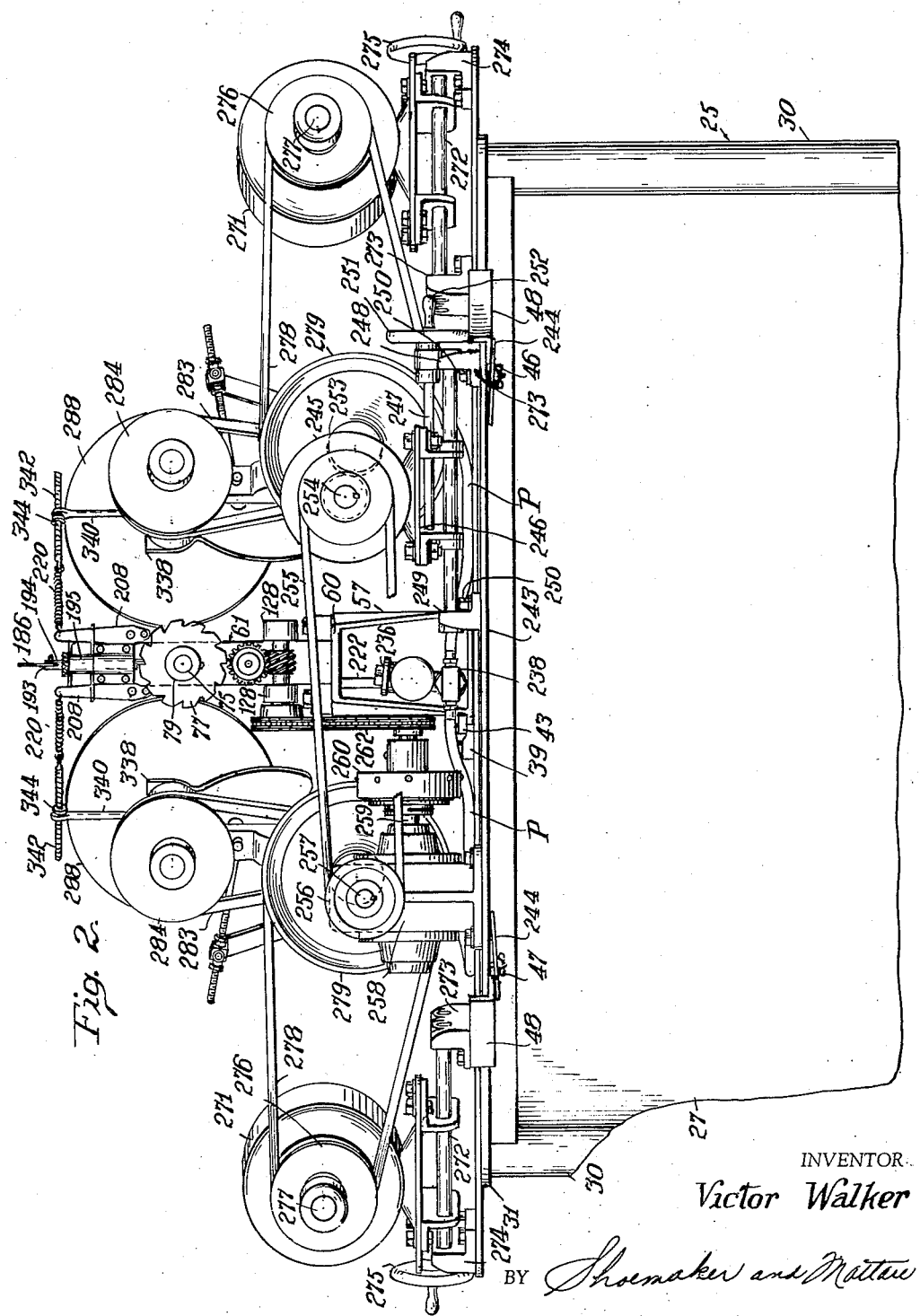

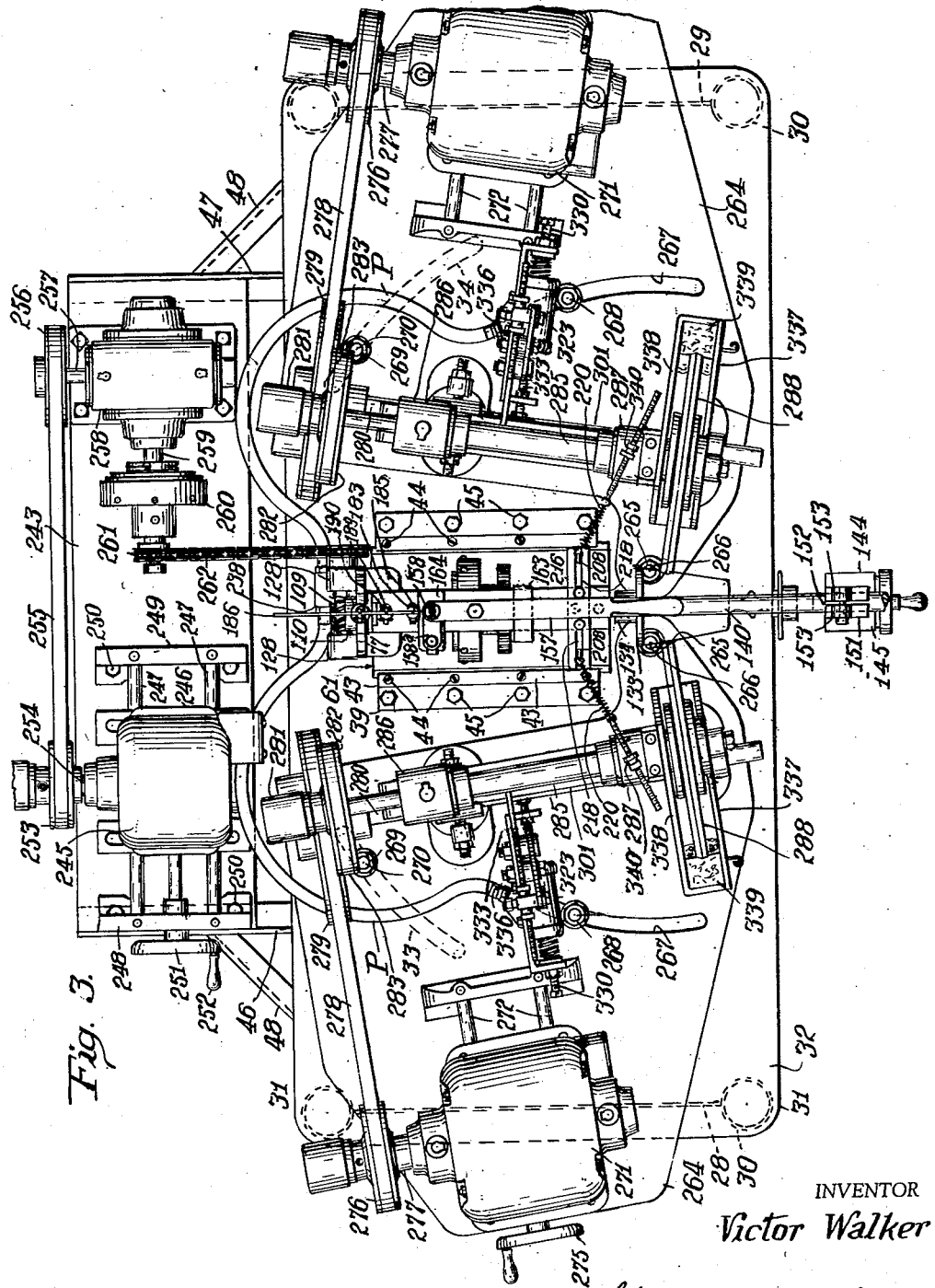

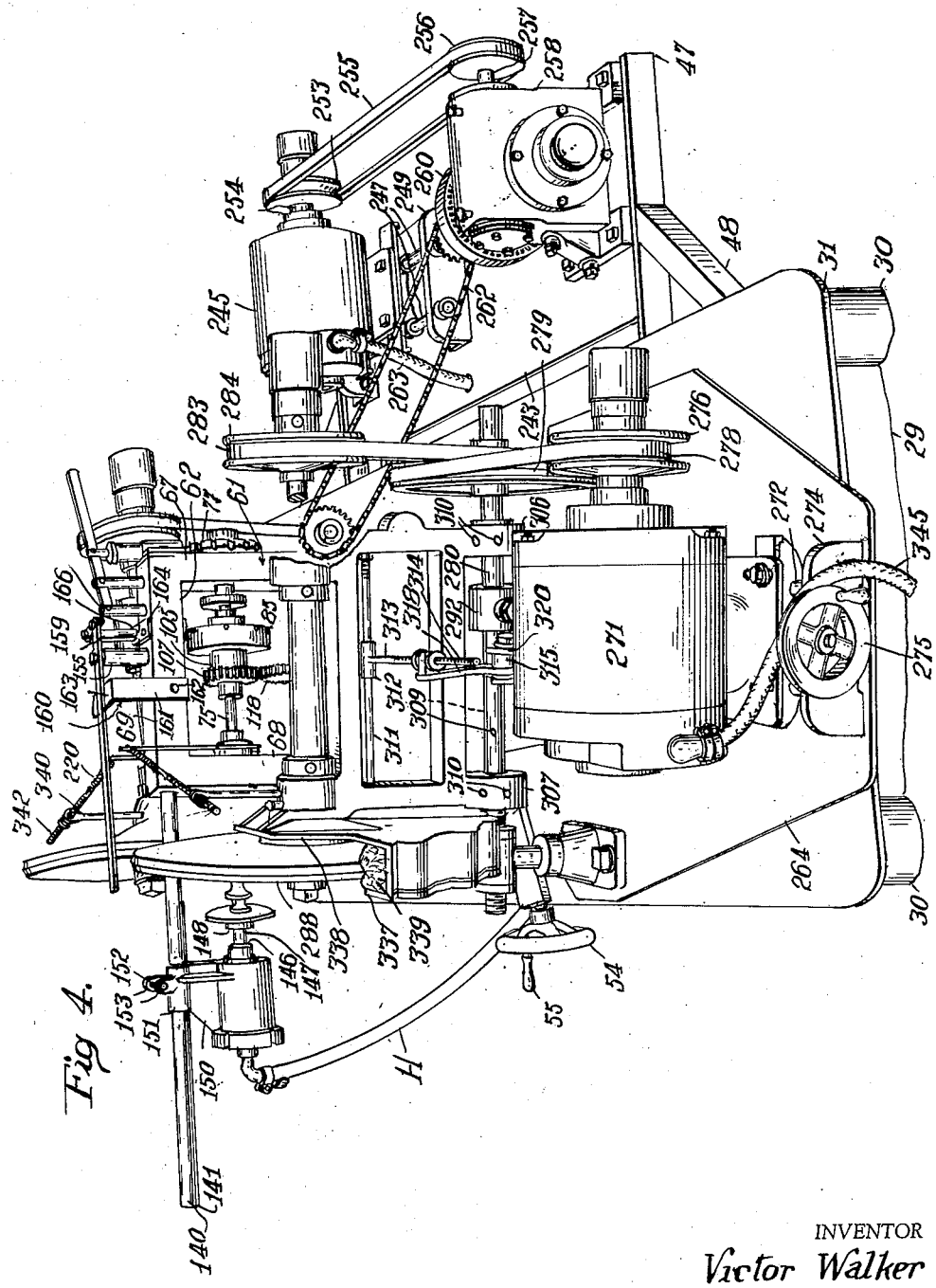

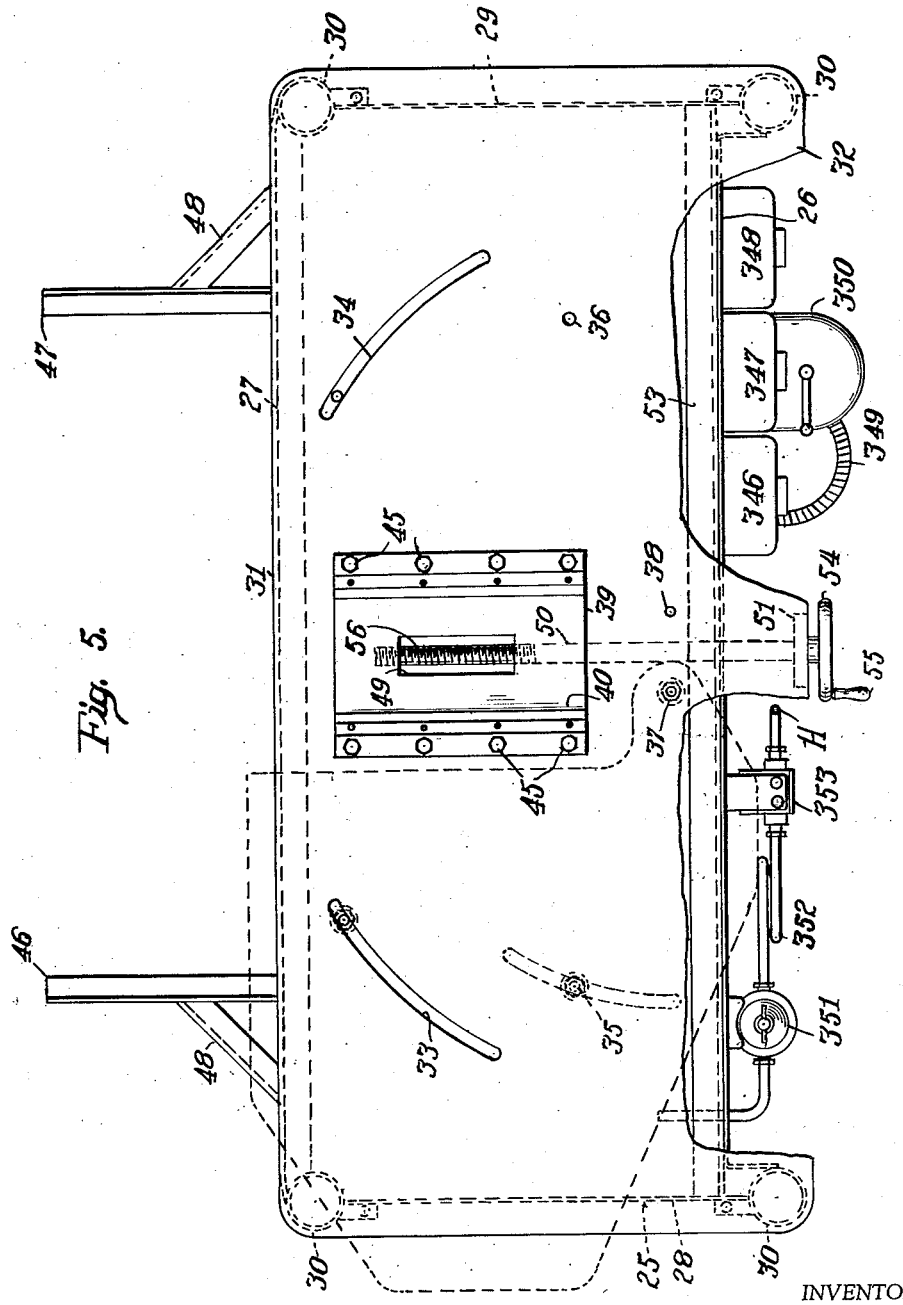

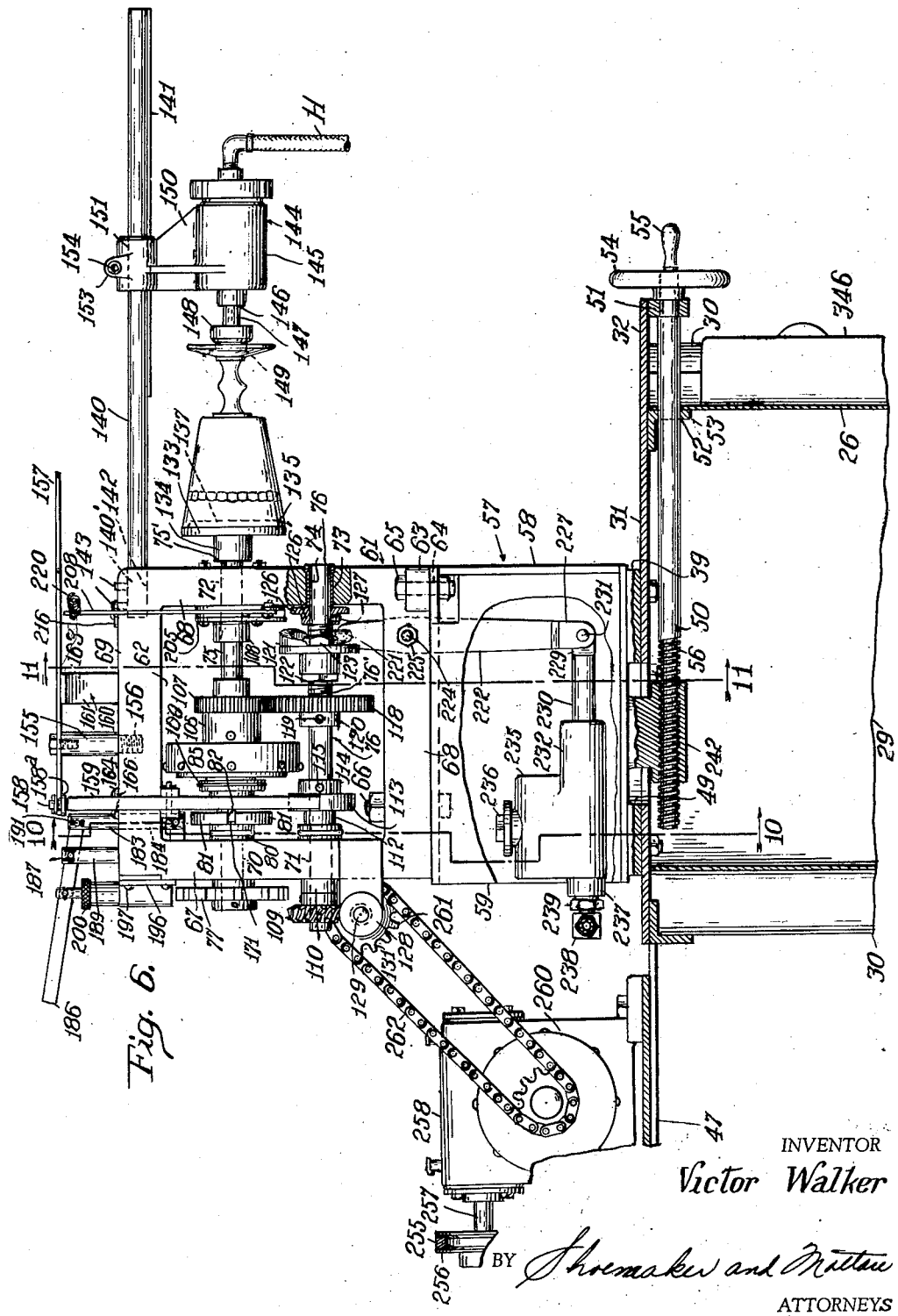

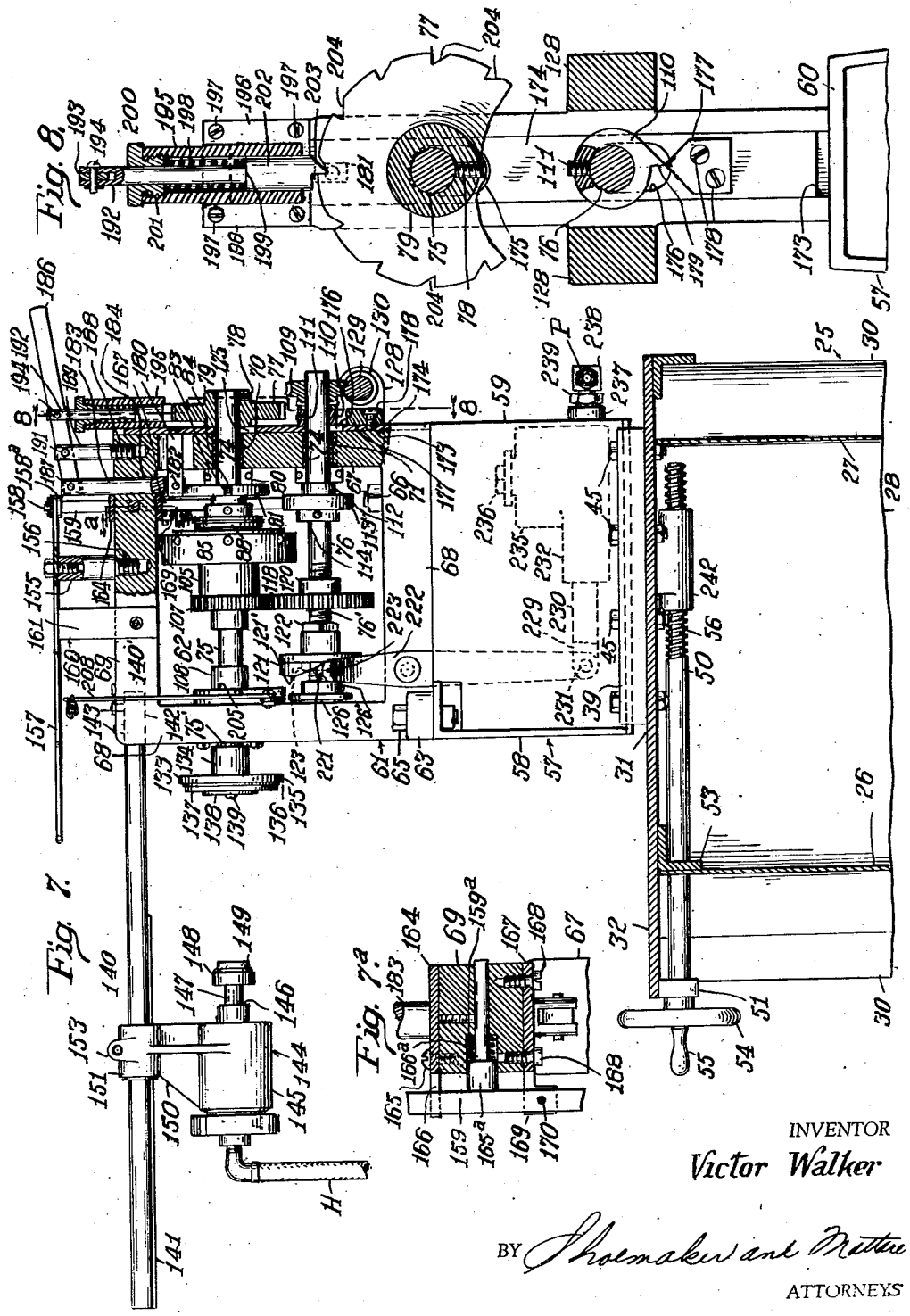

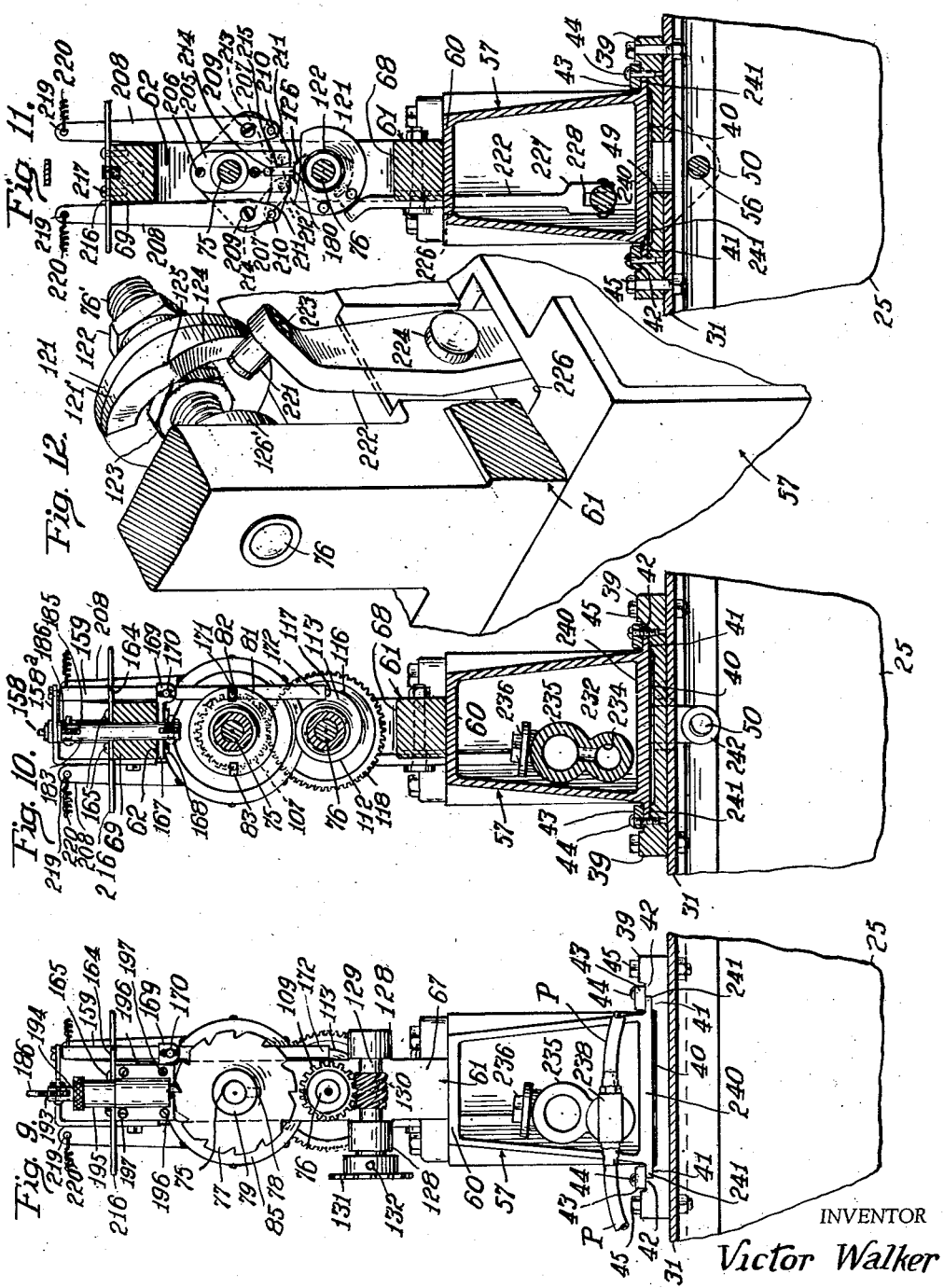

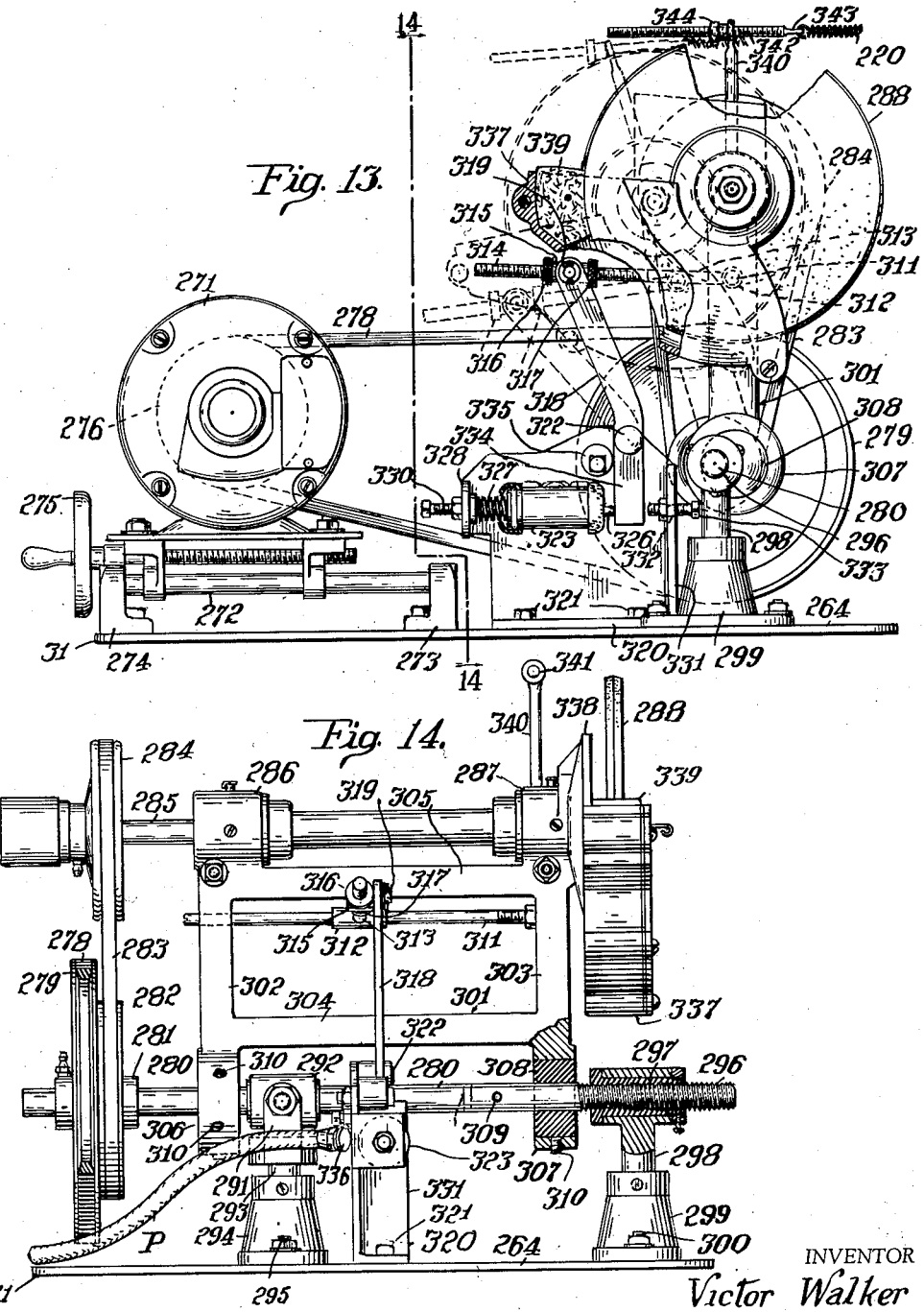

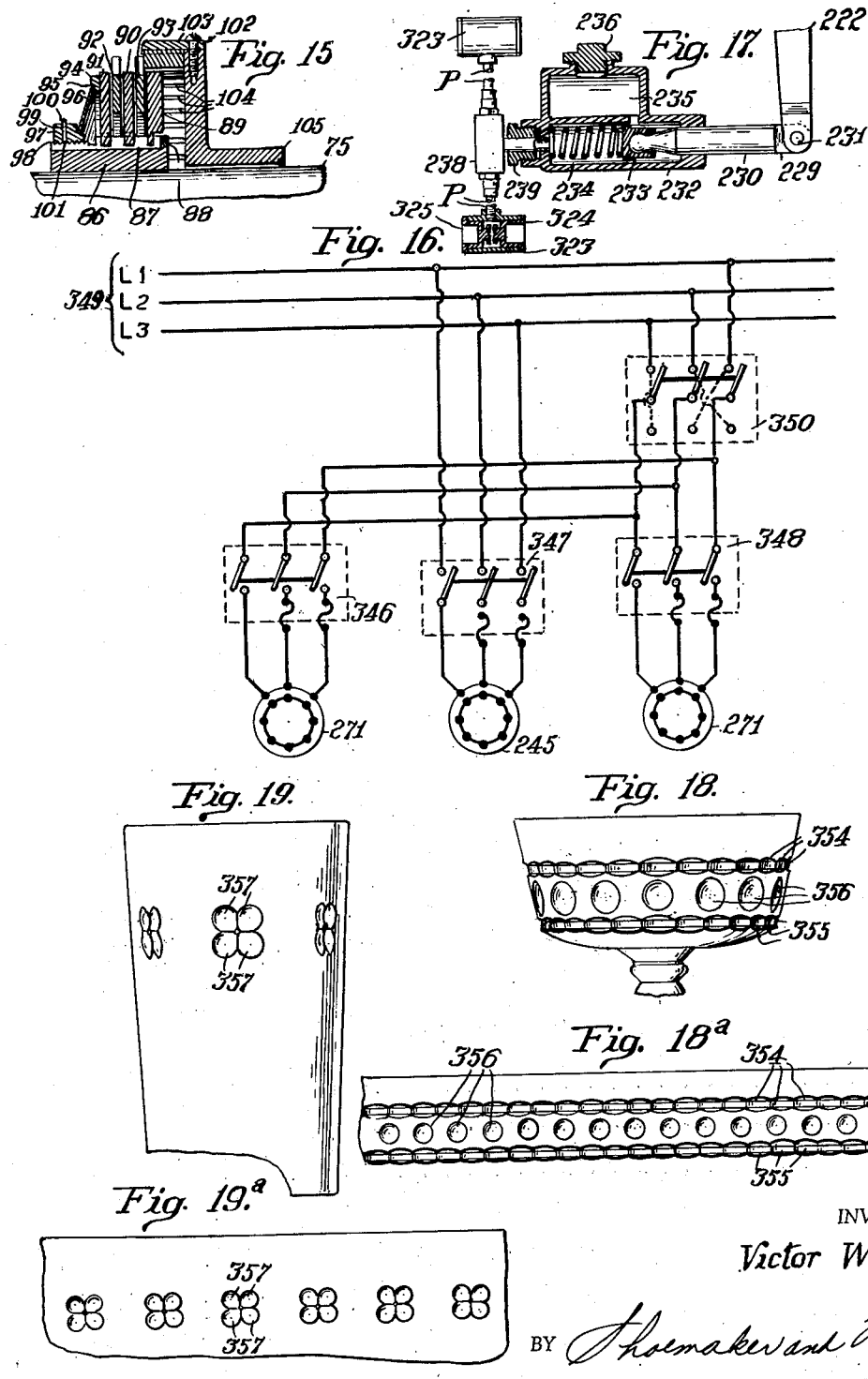

2,795,087

CUTTING OR GRINDING MACHINES

Victor Walker, Morgantown, W. Va.

Continuation of application Serial No. 215,173, March 12, 1951. This application September 15, 1953, Serial No. 380,225

22 Claims. (Cl. 51—89)

This application is a continuation of my copending application Serial No. 215,173, filed March 12, 1951, now abandoned.

This invention relates to a cutting or grinding machine. The invention is more particularly directed to a machine for cutting or grinding portions of the surfaces of various articles so as to remove a portion of the said surfaces for either ornamental or decorative purposes or utilitarian purposes.

The machine is adaptable for removing portions of surfaces from hollow glassware and other hollow objects and articles made of synthetic plastics, metal, wood, etc. Then, too, the machine is adaptable for cutting or grinding solid objects and articles of glass, wood, metal, synthetic plastics, etc.

The machine is substantially fully automatic and, taking as an example the ornamentation or decoration of hollow glassware, the necessary cutting or grinding operations that are performed by rotating, grinding or cutting discs or similar such means, perform their function in removing portions of the glassware according to a predetermined design which is controlled by the surface contour of the cutting or grinding discs. The glassware mentioned may be table glassware or other articles of glass and when the removal of the portions of the glassware or other such articles is effected, the change of the surface contour may serve utilitarian purposes rather than being decorative or ornamental and the same situation obtains with regard to other articles such as may be fabricated from synthetic resins, metal, wood, etc.

In a broad sense, the present machine, which is substantially fully automatic in its operation requiring very few manual adjustments and attention, acts to remove certain predetermined portions of the object or article, whatever it may be, from surface portions thereof which results in either an ornamental or decorative effect or a utilitarian effect or, conceivably, in some instances may serve both effects.

In the present machine, the object or article that is to be worked on by the cutting discs is so fabricated that, with a few simple instructions, an inexperienced operator can utilize this machine for its intended purposes; namely that of removing surface portions of various objects and articles for decorative and/or utilitarian purposes. The simplicity of the machine permits the operator by a simple chucking operation to properly position the article to be worked upon, and there is included in the machine certain selectable different indexing means which serves as a means of control of the chucked article in its rotation so that one or both of the cutting or grinding discs that are also embodied in the machine perform their cutting or grinding operations in a predetermined cycle while the chucked article is stationary and certain hydraulic control means for each of the two grinding or cutting discs is embodied with the machine, which hydraulic means serves as a control for the gradual application of one or both of the discs to the chucked and stationary article and a reverse of this same gradual movement and release therefrom.

The present machine, in effect, automatically reproduces the skilled manual hand operations of grinding or cutting glassware or articles from other materials mentioned hereinbefore. In the glassware industry, the cutting of glassware for table and other use, the skilled operator now holds the glass in his hands and applies gradual pressure of the glassware onto the rotating cutting or grinding disc to effect the ornamentation or decoration and the operator must, of course, rotate the glassware as the grinding of the pattern, whatever it may be, progresses to effect a pattern or design of cutting or grinding of the glass, say about a portion of the entire periphery thereof. In the manual or hand operation of grinding or cutting the glassware or the like, notwithstanding the skill of the operator, it is quite obvious that designs, controlled by the contour of the cutter or grinding disc, that are produced on or about the surface of the glassware, cannot possibly be all of uniform size and depth but they may be so close to it that the average observer would not discern any irregularities. Then, too, in the manual application to and removal of the glassware from the grinding disc, it is quite impossible for the hand operation of the grinding or cutting to result in a design that would not show some slight overlap at the point where the grinding or cutting operation ceased and the glass was manually moved away from the grinding or cutting disc. Here again, it is quite obvious that even the most highly skilled operator in carrying out the grinding or cutting of the glassware would here and there in certain of the glassware either apply it or withdraw it too quickly and this would result in an uneven surface at least at one portion of the ornamentation or decoration on the glassware or whatever other article or object it might be.

In utilizing the machine of the present invention, superior effects of ornamenting or otherwise cutting or grinding the surfaces of glassware or the like are attained in that the gradual and progressive application of the grinding discs to and removal from the work results in cut or ground glassware that is uniform throughout the various patterns and designs that can be effected on the glassware or the like as the means that governs the application of the grinding discs to and from the glassware or the like is so controlled and operated that the same applies the same amount of progressive pressure for the actual cutting or grinding application and the gradual removal therefrom which does not show any overlap or any other discernible imperfections of the cut or grind, whatever it may be, and each design, assuming that it is repeated about the periphery of the glassware or a portion thereof, is absolutely uniform in the depth of the cut or grind and the width, length, etc.

An object with regard to the present machine is that when two grinding or cutting discs are employed, and I preferably use two such discs, each of the grinding or cutting discs is driven by a separate, preferably electric motor, drive and each of these motors are driven at the same speed, and a hydraulic means serves as the control of the grinding or cutting discs in the progressive or gradual movement of these discs into engagement with the glassware or whatever is being worked on and a similar gradual or progressive retrograde or removal of the discs from the glassware or whatever is being worked on. Thus, with the combination of the electric motor drive for each of the grinding or cutting discs and the hydraulic control of the application of the grinding discs to and from the work, glassware or the like or whatever it may be, is chucked and indexed in a cycle so as to have the grinding disc properly applied to the work while the latter is stationary and then as part of that cycle partially rotate the work to present another or other surfaces that are to be cut or ground, and all of which surfaces that are cut or ground and the design being determined by the contour and position of the periphery of the grinding or cutting discs, the ultimate end product of the cutting or grinding of the glassware or the like being a uniform design either intermittently about the periphery or continuously about the periphery of the glassware or the like. In other words, stating the situation another way, by utilizing two grinding or cutting discs that operate on the glassware or the like, one of these discs will be so positioned and arranged relative to the glassware, and this glassware may be a tapered hollow body, so that while at one point of the periphery, one of the discs is performing the ornamentation or decoration which is usually a convex-cut-out portion of the surface of the glassware, the other disc is similarly performing that same function but at a different point on the periphery so that when the glassware has been stopped intermittently in a full cycle of rotation, the discs have then alternately effected the grinding or cutting of the surface portion of the glassware or the like, and the ultimate decoration will be continuous about a peripheral portion of the glassware.

Another object of the present invention is to provide a machine comprised of very few cooperatively arranged and associated component elements and devices; namely what might be called a central unit which has associated therewith an indexing means for the chucked glassware or the like, and the drive therefor, of course, and this central unit is driven by a separate driving motor through suitable reduction gearing and, on opposite sides of this unit, there is a similarly formed grinder unit which carries the rotatable grinding or cutting discs and each of these grinding or cutting units is driven by a separate electric motor and the control of each of these units is in a hydraulic circuit and each of the said units preferably has its own base structure, whereby the same are readily mounted and supported on a plate or top of a cabinet structure or a stand or any other suitable support, and each of the grinding units is so mounted on the table or support so that it can be swung on a vertical pivot to obtain the different angular dispositions of the grinding or cutting disc according to the design of the glassware or whatever is being worked on, for instance, where the body of the glassware is tapered, this allows for an adjustment of each of the grinding discs and, as a matter of fact, the entire grinding units and, additionally, these grinding units also may be adjusted as to their vertical disposition as well as to the proximity thereof to the center unit.

Another object of the invention is to provide a grinding unit or units, each including a rotatable grinding disc, and mounted on a bed plate or plates, and a work holding unit, and hydraulically operated means operatively connected with one or both grinding discs of the grinding units, and with the grinding unit fixedly mounted on the bed plate and the hydraulically operated means serving to move the grinding disc or discs to and from the work on the fixed unit.

Another object of the invention is to provide a grinding unit or units, each including a rotatable grinding disc, and mounted on a bed plate or plates, and a work holding unit, and hydraulically operated means operatively connected with one or both grinding discs of the grinding units, and with the grinding unit fixedly mounted on the bed plate and the hydraulically operated means serving to move the grinding disc or discs to and from the work on the fixed unit, wherein the hydraulically operated means is connected to the means for operating the hydraulically operated means by means of a flexible conduit or the like.

Another object of the invention is to provide a grinding unit or units, each including a rotatable grinding disc, and mounted on a bed plate or plates, and a work holding unit, and hydraulically operated means operatively connected with one or both grinding discs of the grinding units, and with the grinding unit fixedly mounted on the bed plate and the hydraulically operated means serving to move the grinding disc or discs to and from the work on the fixed unit, wherein the hydraulically operated means is connected to the means for operating the hydraulically operated means by means of a flexible conduit or the like, and further wherein the bed plate or plates are each individually and collectively adjustable with respect to a support on which they rest and with respect to each other and the work, and the hydraulically operated means has a flexible conduit or the like connected thereto from a source of supply, and which flexible conduit or the like moves when one or both of the grinding units are being adjusted.

Another object of the invention is to uniquely embody a hydraulically operated means in association and connection with a grinding unit and a work holding unit and which grinding unit is adjustable in its entirety with respect to a support therefor, and a hydraulc means serving to move a grinding disc carried by the unit to and from the work.

Another object of the present invention is a means, preferably spring means, that is associated with each of the grinding units to counterbalance the hydraulic control for each of the grinding units and this spring means for each of the grinding units, together with the hydraulic means for controlling and moving the grinding discs to and away from the work, together serve to effect the gradual application of the grinding discs to the work and, likewise, the gradual retraction of the grinding discs from the work.

Another object of the present invention is that certain adjustment for the entire center unit when mounted on the support is provided and this adjustment allows for a movement of the entire center unit which carries driving means for the indexing mechanism and, of course, the chuck therewith, so that the same may be moved transversely of the support and relative to each of the grinding units so as to dispose the chucked glass or the like, whereby the same may be worked upon slightly inwardly of the open end of the glass or at the base thereof or at any point intermediate the same and, of course, as hereinbefore stated, each grinding unit is adaptable for adjustment on a vertical axis for positioning the grinding discs relative to the work as well as being wholly adjustable up or down relative to the center unit. Thus, there is provided a wide range of flexibility of operation of the machine on devious types and designs of glassware or other similar objects or articles.

It is understood, of course, that changes in the design and cooperative relationship of the component elements comprising the present machine may be resorted to, in accordance with the scope of the claims hereto appended.

In the drawings:

Fig. 1 is a front elevational view of the machine;

Fig. 2 is a rear elevational view;

Fig. 3 is a top plan view;

Fig. 4 is a view slightly in perspective looking in the left hand direction of Fig. 2;

Fig. 5 is a plan view of the cabinet or support for the center and grinding or cutting units;

Fig. 6 is a side elevational view partly in section to show the construction of some of the component elements and showing the glass in chucked position;

Fig. 7 is a view similar to Fig. 6 but showing various other parts of the machine in section;

Fig. 7a is a sectional view taken on the line a—a of Fig. 7 showing some parts in detail;

Fig. 8 is a longitudinal sectional view taken substantially on the line 8—8 of Fig. 7 looking in the direction of the arrows with certain parts broken away;

Fig. 9 is an end elevational view of the machine taken from the left as seen in Fig. 6;

Figs. 10 and 11 are vertical sectional views taken substantially along the lines 10—10 and 11—11 respectively of Fig. 6;

Fig. 12 is a view in perspective showing the cam operation of the hydraulic means for operating the grinding units;

Fig. 13 is a side elevational view of one of the grinding units with certain parts broken away;

Fig. 14 is a vertical sectional view taken substantially along the line 14—14 of Fig. 13;

Fig. 15 is a view partly in vertical section showing a slip clutch;

Fig. 16 is a diagrammatic illustration of the electrical circuits for controlling the driving and grinder unit electrical motor;

Fig. 17 is a diagrammatic view of the hydraulic circuit for operating and controlling the grinding units;

Figs. 18 and 18a are of a glass and the layout of that glass showing variant ornamentations which may be placed thereon; and Figs. 19 and 19a are of a glass and a layout of that glass showing other ornamentations.

The invention will be more readily understood by referring to the drawings in detail wherein similar reference numerals and characters in the several views all denote the same parts or component or cooperative elements.

The support for the cutting or grinding units and the center unit may be in the form of a substantially rectangularly shaped cabinet 25 having a front and a rear panel 26 and 27 respectively, and end panels 28 and 29, and these panels are respectively connected to similarly formed corner posts 30. The panels and corner posts may be of metal and are preferably welded to the respective corner posts. This cabinet is provided with a top plate 31 and the forward portion thereof 32 projects slightly beyond the front wall 26.

As seen most clearly in Fig. 5, top plate 31 of the cabinet or support inwardly of each of the ends 28 and 29 is provided with similarly formed arcuate slots 33 and 34. This plate 31 is also provided with openings 35 and 36, formed similarly to each other, and a pair of openings 37 and 38 which latter openings serve as part of the vertical pivotal means for the grinding or cutting units hereinafter more fully described. Substantially medially between the ends of the top plate 31 of the cabinet or support, there is disposed a bed plate or guide and support 39 for the center unit. This bed plate or guide and support for the center unit is provided with a central depressed portion 40, see Fig. 9, throughout its length and stepped shoulders 41 and 42 at either side thereof also extending throughout the length, and the shoulder 41 serves as a partial means of the guideway for the center unit along with elongated rigid clamping and guiding strips 43, which latter strips are adjustably secured to the guideway by means of a series of bolts 44, and the bed plate or guideway proper is secured to the top plate of the cabinet by means of a series of bolts or the like 45.

Extending laterally from the rear of the cabinet, there is a pair of spaced brackets 46 and 47. These brackets are preferably formed of angle iron and are braced to the cabinet by the diagonal braces 48 and serve as a means for supporting the main driving means for the center unit hereinafter more fully described.

The bed plate 39 is provided with an elongated rectangularly shaped opening 49 centrally thereof. A central unit operating screw 50 extends through a bearing 51 on the bottom side of the extended central portion 32 of the top plate and also through an opening 52 in an angle iron 53, see Fig. 6, that is welded to the underside of the top plate and it, at its extreme end, is provided with an operating rod wheel 54 having a handle 55 projecting laterally therefrom. The inner end 56 of this operating screw is provided with a high speed screw thread and the length of this operating screw is such that the screw-threaded portion thereof is disposed directly beneath the elongated opening 49 in the bed plate so that this operating screw is in the proper position to engage complemental interior screw threads on a nut depending from the center unit, and which nut passes through the said opening 49 and thus the center unit is adapted to be moved within prescribed limits as determined by the opening 49 when the operating handle 55 is turned.

*The center unit*

The center unit comprises a base portion 57 which is substantially hollow and is preferably closed at its front 58 and open at the rear 59 thereof and with a closed top 60. A frame 61 surmounts the base portion 57 and this frame is substantially square in outline and is open at its center portion 62. The bottom of the front part of the frame has laterally extending integral similarly formed lugs 63 with openings therein, and the top of the base has openings 64 which register with the openings in the lugs, and bolts 65 extend therethrough and serve with bolt 66 to secure the frame on the base of the center unit, it being understood that this bolt 66 also extends through an opening, not shown, in the frame and the top of the base. By means of the aforesaid bolts, the frame 61 is securely but detachably connected with the base 57.

This frame 61 includes vertically aligned upstanding arms 67 and 68 which are connected at the top by the cross piece 69. As shown in dotted lines in Fig. 6, the upstanding arms 67 and 68 are each provided with openings 70 and 71, and these two said openings are in horizontal alignment with similar openings 72 and 73 in the upstanding arm 68 and, of course, all of these openings are provided with suitable bearings 74.

A pair of upper and lower shafts 75 and 76 are disposed in vertical spaced parallelism and are rotatably mounted in the said bearings 74. The upper shaft 75, outwardly of but in close proximity to the upstanding arm 67, has the indexing rigid wheel 77 removably secured thereto by means of the set screw 78 and this indexing means is provided with a hub 79 which projects slightly on both sides of the axial face thereof. On the inner side of the upstanding arm 67, there is a thrust bearing 80 adjacent the opening 70, and immediately adjacent thereto, there is a disc 81 keyed to the upper shaft 75 and this disc has a notch 82 therein and which notch serves as a means for allowing cam operating locking mechanism for discontinuing rotating of shaft 75 and 76 hereinafter more fully described. Additionally, if a different cycle of operation or rotation of the shaft 75 is desired, this disc 81 is provided with a removable block section 83 maintained in position by a set screw 84, also more fully described hereinafter.

On this same shaft 75 and in axially spaced relation to the disc 81, there is a conventional slip type or friction clutch denoted generally at 85. This clutch is substantially as shown in Patents 1,427,025, Schlafly, August 22, 1922 and 2,432,591, Schuckers, December 16, 1947, and more particularly as shown in Fig. 15 of the drawings wherein the shaft 75 has splined thereto an elongated hub 86, which hub is provided with a plurality of equally distributed grooves 87. A locking ring 88 which has projections that fit in the grooves 87 serves to maintain the respective alternate, similarly formed metallic discs 89, 90 and 91, which also have projections fitting in the grooves, on the shaft 75 and, inbetween the discs 89 and 90 and 91, there are similarly formed clutching discs 92 and 93 which are provided at their peripheries with a series of spaced teeth. The aforesaid discs and the discs with the teeth thereon are adapted to be brought into and out of selective frictional engagement by means of a circular ring 94 which is undercut at 95 and such undercut forming a seat for the peripheral edge of a pressure applying disc 96, and the selected pressure being adjusted and regulated by the interiorly screw-threaded ring 97, which ring is mounted on the threaded end portion 98 of the hub 86. This adjusting ring 97 is provided with a series of spaced openings 99 extending through the same and, in these openings, there is adapted to be received the spring locking ring 100, the end portion of which 101 is adapted to drop down into one of the grooves 87 in the hub; thus when the proper frictional adjustment of the clutch is attained, the aforesaid discs are locked or held together in their proper adjusted relationship.

The other part 102 of the clutch is substantially cup shaped and has a circular flange 103, the interior of which flange is provided with a continuous series of grooves 104 which correspond in shape to the teeth on the periphery of the discs 92 and 93. This cup-shaped member of the clutch has a laterally extending integral spacer in the form of a sleeve 105. The sleeve extension 105 is provided with a plurality of spaced screw-threaded openings 106 and, in these openings, suitable screws such as the well-known Allen screws are disposed to maintain the cup-shaped portion 102 of the clutch in proper association with the remaining part thereof. The cup-shaped portion 102 of the clutch, it will be understood, is not keyed to the shaft 75 or the hub 87 but, of course, is clutched thereto by means of the interengagement of the teeth on the discs 92 and 93 in the grooves 104 interiorly of the cup-shaped portion of the clutch when these discs are in frictional engagement with the alternate discs of the clutch. A gear 107 is affixed to the extension sleeve 105 and rotates therewith and with the cup-shaped portion 102 of the clutch. Inwardly of and spaced from the gear 107 there is a spacer sleeve 108 affixed to the shaft 75.

The shaft 76 at one end thereof on the outer side of the upstanding arm 68 has keyed thereon a worm gear 109 and inwardly thereof there is a slide operating cam 110 which is secured to the shaft 75 by means of a set screw 111, and this shaft passes through the bearing 74, which bearing projects on the inner side of the upstanding arm 68 and, of course, about the shaft 76. A spacer element 112 spaces the locking cam 113 and this locking cam has a laterally extending integral collar 114 and this collar is provided with a screw-threaded opening into which an Allen set screw 115 is disposed for maintaining the cam on the shaft and to be rotatable therewith. The cam, as will be seen from Fig. 10, has a peripheral cam surface 116 and a locking abutment 117. A gear 118 of substantially twice the diameter as the gear 107, and in mesh with this latter gear, is affixed to shaft 76 by means of a set screw 119 in a collar 120, and which collar is integral with the gear 118.

The end portion 76' of the shaft 76 is exteriorly screw-threaded. A hubbed cam 121 is mounted on this screw-threaded portion 76' in an adjustable manner by the interiorly screw-threaded nuts 122 and 123. The axial face 121' of the cam 121 has the cam surface 124 thereon and it will be noted from Fig. 12 that the peak 125 of the cam is substantially at the central part thereof. This cam 121 is the actuator for the hydraulic control means for each of the grinding or cutting units hereinafter more fully described.

Also mounted on the shaft 76 beyond the threaded portion, there is a cam 126 of lesser dimensions than the cam 121 and this cam 126 serves to operate certain linkage mechanism which is thereunder or apply spring tension and, with the hydraulic control of each cutting or grinding unit, serves to allow the progressive application of each grinding disc to and away from the work. The periphery of the cam 126 is the actual camming surface and this cam has a laterally extending hub 126' and is held on the shaft 76 by means of a set screw 127 and is disposed slightly on the inner side of the upstanding arm 68, and the remaining portion of that end of the shaft 76, of course, is disposed in the bearing 74 in the opening 73.

Adjacent the lower end of the upstanding arm 67 there is an integral U-shaped rearwardly extending bracket 128. Each of the arms constituting the U-shaped bracket are provided with an opening, which openings are in horizontal registry. A stub shaft 129 is rotatably mounted in the U-shaped bracket and integral therewith substantially intermediate the ends and disposed between the arms of the bracket, there is a worm 130 and which worm is constantly enmeshed with the worm gear 109. The shaft 129 extends beyond one of the arms of the bracket 128 and has secured thereto a hubbed sprocket gear 131 and, in the hub portion of which there is a set screw 132 which maintains this sprocket gear on the end of the shaft and serves to rotate the latter when driven as hereinafter more fully described.

The shaft 75 extends through the opening 72 in the upright arm 68 and beyond as indicated at 75' and, on this end of the shaft, one component chuck element 133 is mounted. This chuck element 133 comprises a hub portion 134 and a disc 135 integral therewith and is rigid of course. A disc 136 preferably of rubber and substantially of the same diameter as the disc 135 and a smaller but preferably thicker interchangeable, and of rubber, disc 137, and a substantially rigid disc 138 of considerably less diameter than the last mentioned rubber disc, each of which discs has a central opening therein, are held on the main chucking disc 133 by means of the bolt or screw 139 which engages interior screw threads, not shown, in the extreme projecting end portion 75' of the shaft 75. The rubber discs 137 are interchangeable and different diametered discs may be utilized depending upon the diameter of the glassware or other article that is to be chucked and this is accomplished by simply removing the screw 139 and replacing the same.

The remainder of the chucking means comprises an elongated rigid rod 140 which has an integral elongated key 141 that is partly coextensive in length therewith and this rod 140 extends laterally outwardly from the frame and is held in association with the same by means of having the end 140' thereof in a socket 142 in the upper cross piece 69 of the frame, and the rod is held in its association by means of a set screw 143 or any other suitable securing means. While this rod is shown as being round in cross section with the key 141 associated therewith or integral therewith, the same may be of polygonal cross section throughout its length and seated in a polygonal socket in the frame.

The tail piece of the chucking means is denoted generally at 144 and it comprises an air cylinder 145 which has a reduced opening 146 in one end thereof through which the shaft 147, at the end of which there is a small chucking head 148, passes, the forward portion 149 thereof being preferably of rubber or other elastic material. This chucking head 148 is anti-frictionally mounted on the end of the shaft 147 or, in other words, it is freely rotatable on the shaft by means of ball or other suitable bearings. The shaft 147 extends within the air cylinder 145 and there is a piston and spring in this cylinder, not shown, and which piston, of course, is connected with the shaft 147 and the spring serves to normally retract the shaft 147 within the air cylinder 145 while suitable air under pressure delivered from the hose H from any suitable source serves to move the shaft and consequently the chucking head 148 outwardly. This air chucking cylinder 145 has a laterally extending integral bracket 150 and this bracket terminates in a sleeve 151, which sleeve is split at 152 and suitable oppositely disposed lugs 153, see Figs. 3 and 4, provide means for a set screw 154 to engage interiorly screw-threaded openings in said lugs to clamp or fixedly position the air cylinder in proper adjusted relationship on the supporting rod or arm 140.

Pivotally mounted on the post 155 threadedly engaged in an opening 156 in the cross piece 69 is a lever 157 extending forwardly of the frame of the center unit. This lever 157 is pivotally connected by means of a pivot 158 to a link 158a which, in turn, is pivoted to a latch arm 159. The lever is supported intermediate its ends and the pivot 158 by a rest member 160 consisting of a right-angular bracket with the vertical portion 161, see Fig. 4, connected to the cross piece 69 by means of a bolt 162. The lever 157 rests upon the angular portion 163 of the rest member 160.

Mounted upon the cross piece 69 is a plate 164 connected by screw members or the like 165 having bifurcated ends 166 which straddle the latch arm 159 and serve as a guide for the latch arm. Directly under the plate 164 and on the underside of the cross piece is a second plate 167 also connected to the cross piece by means of screws 168 and having bifurcated ends 169, see Fig. 10, extending outwardly beyond the cross piece and connected to the latch arm 159 by means of a pivot 170. Disposed below the pivot 170 and extending outwardly from one side of the locking arm 159, is a pin 171 which, during certain movement of the shaft 75 carrying the disc 81, is received in notch 82 hereinbefore described. The end 172 of the locking lever 159 is engaged during certain movements of the shaft 76 by the end of the locking cam 113. As disclosed in Fig. 7a, the cross piece 69 has a counterbored opening 159a extending therethrough. Received within the opening is a headed pin 165a, the head of which engages at all times the upper part of the locking lever 159. A coil spring 166a is interposed between the counterbore and the head of the pin to force the head outwardly against the locking lever 159. The pivot 170 being below the pin 165a causes the lower end of the locking lever 159 to be forced inwardly so that the pin 171 constantly rides the surface of the disc 81 and, when any of the slots 82 are in a position to receive the pin 171, it is forced thereinto.

A recess 173 is formed on the outside of the upstanding arm 67 of the frame in which is slidably mounted a slide designated 174. This slide has upper and lower slots 175 and 176 respectively through which extend the shafts 75 and 76 so that the slide is vertically movable in the recess 173 without in any way binding the shafts 75 and 76. Mounted adjacent the lower end of the slide 174 is a cam block 177 by screws 178. This block is engaged by the slide operating cam 110 during rotation of the shaft 76, to move the slide 174 vertically at times when the high point 179 of the cam engages the cam block 177. Fixedly secured to the upper end of the slide is an arm 180 extending through a slot 181 in the upstanding arm 67. The arm 180 extends inwardly into the center portion 62 and is connected by pivot 182 to an upright pin 183 slidably mounted through an opening 184 in the cross piece 69. The upper end of the pin 183 is bifurcated as at 185 and fitted within the bifurcation is a lever 186 pivoted to the pin 183 by a pivot 187. Threaded within an opening 188 in the cross piece 69 is a post 189 which is likewise bifurcated at its upper end as shown at 190. A pivot pin 191 extends through the bifurcations and the lever 186 becoming the fulcrum point for the lever 186.

Intermediate its ends, the lever 186 is pivotally connected to a pin 192 having bifurcated upper ends 193 with a pivot pin 194 extending through the bifurcations and the lever 186. The pin 192 is slidably mounted within a tube 195. Integral with the tube 195 are ears 196 which are mounted upon the outside of the upstanding arm 67 by means of the screws 197 thus securing the tubular element to the framework of the center unit. Within the tube is a coil spring 198 bearing against a shoulder 199 on the pin 192 at one end and the other end against the cap 200 connected by threads 201 to the tube 195. The pin 192 has an enlarged end 202 extending outwardly through the lower end of the tube 195 which is formed into a locking pawl 203 which engages the ratchet notches 204 formed on the periphery of the indexing wheel 77. At certain times during the operation of the machine, which will be more fully described, the high point 179 of the cam 110 forces the cam block 177 downwardly which, through the slide and other members just described, raises the pin 192 upwardly disengaging the pawl 203 from the notches 204 allowing the indexing wheel 77 to rotate until the next adjacent notch is engaged by the pawl end 203 of the pin 192.

Secured to the inside of the upstanding arm 68 and surrounding the shaft 75 is a bracket 205, see Fig. 11, secured to the upright by screws 206. The bracket has outstanding on both sides thereof ears 207 upon which are pivotally connected arms 208 by the pivots 209. At the extreme lower ends of the arms 208 and pivotally connected thereto by means of pivots 210 are links 211. The opposite ends of the links 211 are pivotally connected by pivots 212 to a cam follower block 213 having an upstanding lug 214 centrally thereof and engaged by a slot 215 in the bracket 205. The cam follower 213 engages the cam 126 mounted on the shaft 76 and is operated thereby. The upper ends of the arms 208 extend above the cross piece 69 and are guided in their operation by the oppositely bifurcated plate 216 affixed to the cross piece 69 by the screws 217 with its bifurcations 218 straddling the arms 208. The extreme upper ends of the arms 208 have openings 219 therein in which are mounted the ends of coil springs 220 which extend outwardly from each side of the center unit and which are connected to each of the grinding units as and for the purpose which will be described hereinafter.

The cam surface 124 of the cam 121 during its rotation caused by the shaft 76' engages a roller 221 mounted upon the upper end of a lever 222 by means of a post 223. Intermediate its ends, the lever 222 is pivotally mounted upon the base of the frame 61 by a pivot bolt 224 extending through the lever and base and having a nut 225 on the other end thereof. Below the pivot and in the closed top 60 of the base portion 57 is a slot 226 through which the lever 222 extends into the hollow portion of the base. The lower end 227 of the lever 222 is bifurcated as at 228 and straddles the reduced end 229 of a piston rod 230 by a pivot 231. The piston rod 230 extends into a master cylinder generally designated 232 which is the same as the master cylinder and reservoir of the ordinary hydraulic brake system as disclosed in the patent to Carroll, 2,009,433, issued July 30, 1935 and more particularly as shown in Fig. 17. This master cylinder consists of a piston 233 connected to the end of the rod 230 and working within the cylinder 234. A reservoir 235 is mounted above the cylinder having a closure 236 through which additional fluid may be placed therein. The outlet 237 of the hydraulic cylinder 232 has connected thereto a T 238 by means of a nut 239. The T 238 has extending outwardly from each end thereof pipes or flexible conduits P which extend to the operating cylinders on each of the grinding units hereinafter more fully described.

The entire center unit which has been previously described is mounted upon the base 57, which base is closed at the bottom thereof by a plate 240 and outwardly extending from each side of the bottom and extending the full length thereof are ears 241 which rest upon the stepped shoulders 41 of the bed plate 39. The elongated clamping guide strips 43 engage the upper surface of the ears 241 to securely clamp the center unit to the bed plate 39 of the table or cabinet 25. Extending downwardly approximately in the center of the bottom 240 is a nut 242 which is interiorly threaded with high speed screw threads and through which the threaded end 56 of the operating screw 50 extends. Thus, it will be seen by turning of the hand wheel 54 by its handle 55, the rod 50 will be rotated thus threading the nut 242 forwardly or rearwardly at a high speed which direction is determined by the direction of rotation of the wheel 54. The center unit is limited in its movement by the length of the slot 49.

*Power unit for center unit*

As shown in Fig. 3, a bed plate 243 is adjustably mounted upon the spaced brackets 46 and 47 by means of clamping members 244 affixed to the underside of the bed plate 243 and engaging the bed of the brackets 46 and 47. An electric motor 245 mounted upon a base 246 is slidably supported upon rods 247, the ends of which are secured in brackets 248 and 249 fixedly supported upon the bed plate 243 by means of bolts 250. The motor 245 is adjusted longitudinally of the rods 247 by means of a nut and screw, not shown, actuated by a hand wheel 251 having a handle 252 thereon. An adjustable V-belt pulley 253 is mounted on the shaft 254 of the motor and drives the V-belt 255. The belt 255 is trained over a pulley 256 mounted upon an input shaft 257 of a speed reducer unit 258. The output shaft 259 of the speed reducing unit is connected to a friction slip clutch generally designated at 260 which is of the type generally disclosed in the two patents aforementioned and particularly disclosed in Fig. 15 as the clutch unit 85. The output of the clutch has a sprocket wheel 261 integral therewith driving a sprocket chain 262 which drives the sprocket wheel 131 mounted upon the shaft 129 of the center unit previously described.

The electric motor 245 derives its current from cable 263. By rotating the hand wheel 251 and moving the motor 244 either toward or away from the speed reducing unit 258, the V-belt pulley 253 is adjusted in a manner well known to those skilled in the art to either increase or reduce the ultimate speed of the sprocket 261.

*Grinding unit*

In describing the grinding unit, I will refer to one such unit, it being understood that two units are or can be used simultaneously and that each unit is an exact duplicate of the other. Therefore, the same reference numerals will be used in describing the like parts of both units.

As previously described in connection with the cabinet 25, there were referred to slots 33 and 34, the openings 35, 36, 37 and 38 in the top 31.

The grinding unit is mounted upon a bed plate 264 and has an opening 265 which is adapted to coincide with either of the openings 37 or 38 and through which a bolt 266 is passed to pivotally fasten the bed plate 264 to the top 31. The opening 265 and bolt 266 are positioned directly below the chuck 133 of the center unit and pivotal movement of the bed plate 265 is about the axis of the bolt 266. In the front part of the plate, there is a slot 267 which is on a different curvature than the slots 33 and 34 of the top 31. The slot 267 is adapted to overlie the openings 35 and 36 of the cabinet top and a bolt 268 is adapted to pass through the slots and the openings. An opening 269 in the rear part of the plate 264 overlies the slots 33 and 34 in the cabinet top and a bolt 270 is adapted to pass through the slot and opening. Through the two slot arrangements and depending upon the type of grinding disc being used, the bed plate can be adjusted through the length of the slots and on the axis of the bolt 266 to make the grinding disc bear against the surface of the article being worked at any angle desired.

An electric motor 271 is mounted through rods 272 and brackets 273 and 274 upon the bed plate 264. The motor is slidably adjusted upon the rods 272 through the nut and screw arrangement, not shown, operated by the hand wheel 275. An adjustable V-belt pulley 276 is mounted on the shaft 277 of the motor. A V-belt 278 passes from the pulley 276 to a large pulley 279 freely mounted upon a rod 280 by a hub 281. Also on this same hub is a smaller pulley 282 having a belt 283 thereon driving a pulley 284 fast on shaft 285. The shaft 285 extends through bearings 286 and 287 and has on its opposite end a grinding disc 288. The grinding disc is removably mounted upon the shaft 285 and is mounted upon a hub 289 which is threadably engaged with the threaded end 290 of the shaft 285 and locked thereon. The rod 280 comprises the support for the grinding unit and is mounted to the bed plate 264 at the rear part thereof upon an adjustable yoke 291 having a bearing 292 through which the rod passes and a post 293 vertically adjustably mounted in an upstanding base 294 affixed to the bed plate 264 by the bolts 295. The fore part of the rod 280 is threaded as at 296 and is received within the integrally threaded bearing member 297 supported upon the post 298 which is vertically adjustable within the upstanding base 299 affixed to the bed plate 264 by the bolt 300.

As seen in Fig. 14, the bearings 286 and 287 are mounted upon the upper part of a frame generally designated at 301 having upstanding ends 302 and 303, a bottom part 304 and a top part 305. Extending downwardly below the ends 302 and 303 are housings 306 and 307 respectively within which are rotatably mounted eccentrics 308. These eccentrics are affixed to the rod 280 and are rotated thereby when a tool is inserted in either of the openings 309 in the rod 280. By the use of the eccentrics and the vertically adjustable posts 293 and 298, coarse and fine vertical adjustments of the grinding disc 288 are obtained.

Mounted within the ends 302 and 303 and immediately below the top 305 of the frame 301 is a rod 311 upon which is slidably mounted a sleeve 312. Integral with the sleeve is a rod 313, more than half of which has threads 314 thereon. Threadably mounted upon the threads is a sleeve 315 and which may be locked in the adjusted position by nuts 316 and 317 at each end thereof. Pivotally mounted upon the sleeve 315 is a hydraulic system operated lever 318 by means of a pivot 319. Upstanding from the base 264 is a plate 320 connected to the base by bolts 321. The hydraulically operated lever 318 is pivoted at 322 to the upper part of the plate 320. A hydraulic motor 323, which is the same as a hydraulic motor used as the braking cylinder mounted within the brake drum of an automobile and operating the brake shoes thereagainst, is used.

As shown in Fig. 17, the cylinder 323 has two oppositely disposed pistons 324 and 325 therein, the piston 324 operating a pin 326 when fluid is forced inbetween the pistons. The piston 325 acts against the spring 327, one end of which bears against the piston with the other end bearing against an ear 328 at right angles to the upstanding plate 320 having an opening 329 therein through which passes an adjusting screw 330 to adjust the compression of the spring 327 against the piston 325.

At the opposite end of the upstanding plate 320 to the ear 328, is a flange 331 having an opening 332 therein through which passes an adjusting screw 333. The end 334 of the hydraulically operated lever 318 and extending below the pivot 322 is engaged by the pin 326 to force the lever and its connected parts as well as the frame 301 and the grinding disc 288 to the dotted line position disclosed in Fig. 13, with the rod 280 as the axis of movement. This action removes the grinding discs 288 from the surface of the work piece when the high point 125 of the cam 124 actuates the lever 222 causing the piston 233 to force the hydraulic fluid through the system into the double acting cylinder 323. The throw of the pin 326 and the lever end 334 are adjustable by the adjusting screw 333. The return of the lever 318 and its ends 334 is stopped by an eccentrically adjustable stop member 335.

The pipes or flexible conduits P, as previously described, which are connected to the T 238, are connected to the double acting cylinder 323 through an opening in the cylinder wall and plate 320 by any suitable pipe joint connection 336, and the lengths of the conduits between their connections being so calculated to allow the hereinbefore adjustments to be made and the conduits to move while the adjustments are being made.

The hereinbefore described adjustments allow the discs of each grinding unit to be set at any desired angle with respect to the work or to each other so that the disc or discs may cut or grind the work at any point of its surface. Also vertical adjustment of one or both cutting or grinding discs can be made by means of the posts 293 and 298 and the eccentrics 308, which adjustment will position the cutting or grinding disc at any vertical point on the surface of the work. Therefore, the cutting or grinding units and their discs may be moved or adjusted at any angle or position with respect to the work or with respect to each other. The grinding or cutting discs are moved away from the work by means of the hydraulic system when the cam 121 on the center unit operates the lever 222 to actuate the master piston 233 and force the hydraulic fluid through the flexible hoses P to operate the pistons 324 in each cylinder 323 on each grinding unit. The use of the flexible hoses or conduits P, which move of course, allows all of the aforementioned movements or adjustments of the grinding or cutting units and their associated cutting or grinding discs to be made without in any way disturbing or adjusting the hydraulic system or any adjustments etc. to other operating mechanisms. Therefore, no matter what movements or adjustments are made to one or both of the cutting or grinding units, and once the hydraulic system is set, the hydraulic system will operate efficiently. Once having set the hydraulic system so that the cutting units will move to and from the work, no other adjustment of the hydraulic system is necessary irrespective of any movement or adjustment of one or both grinding or cutting units or their grinding or cutting discs relative to the work or to each other.

A water guard 337 partially surrounds the grinding disc 288 and is fastened to the upper part of the frame 301 by the plate 338 on the rear end of the grinding disc. Within the water guard is a sponge or like member 339 which aids in distributing the water to the grinding disc 288.

Secured to the bearing 287 is an upstanding post 340 having an opening 341 at the upper end thereof through which freely passes a screw threaded spring adjusting pin 342. The end of the pin 342 adjacent the center unit has an opening 343 therein. One end of the spring 220 is connected to this opening 343 while the other end of the spring is connected to the arms 208 as previously described. The tension of the spring 220 is adjustable by means of a nut 344 bearing against the upper end of the post 340. The motors 271 obtain their power through the cables 345, see particularly Fig. 4.

On the front wall 26 of the cabinet are mounted three switches 346, 347 and 348, which switches as disclosed in Fig. 16, are of the thermal overload type. Switches 346 and 348 are in the line to each of the grinding disc motors 271 and control the current to these motors from the three-phase power line 349. The switch 347 connects the motor 245 to the power source 349. A reversing switch 350 is interposed between the power line and the switches 346 and 348 so that the two motors 271 on the grinding disc units may be reversed whereupon the discs may be reversed in the manner well known to those skilled in the art of dressing grinding discs.

Also mounted on the front panel 26 is a pressure control valve 351 connected within the line 352. Also in the line 352 is a shut off valve 353 of any well-known type, the outlet end of which is connected to the hose H which feeds the air to the cylinder 144 which operates the tail piece 148 of the chuck member.

*Mode of operation*

In operating the machine, a glass is first placed on the chuck 133 with the smaller rubber disc 137 within the inner periphery of the glass and the mouth resting upon the larger rubber disc 136. The tail piece of the chuck is moved by hand forwardly on the rod 140 until the rubber pad 149 engages the base of the glass. The tail piece is moved sufficiently against the base of the glass to hold the glass in the set position without the glass dropping away from the two parts of the chuck. The tail piece of the chuck and its air cylinder 144 are then locked on the rod 140 by tightening the screws 153. Air is admitted to the air cylinder 144 by operation of the hand valve 351 so that the glass is securely clamped in the chuck.

The center unit is adjusted by means of the high speed screw 56 and the nut 242 carried by the center unit transversely of the table or cabinet depending upon the height of the glass body which has been placed in the chuck and also depending upon the points on the glass body that are to be cut by the grinding discs. After adjustment of the center unit, its drive on the bed plate 243 is adjusted upon the brackets 46 and 47 to maintain the sprocket chain 262 tight between the sprockets 261 on the drive unit and 131 on the center unit.

The base plate 264 of each of the grinding units is then adjusted by means of the bolts in the two slots 267 and the slots 33 and 34 in the cabinet top until the grinding discs 288 are at right angles to the surface of the glass. The grinding discs are not necessarily at right angles to the axis of the glass as this would only be true if a perfectly cylindrical glass were used. If the glass is tapered, then the grinding discs must be at right angles to the tapered surface. After adjustment of the bed plates 264 of each of the grinding units in this manner, they are tightened by the bolts 268 and 270 so that the grinding discs will be held in the adjusted position. The grinding discs are adjusted vertically by means of the adjustable supports 294 and 299 and the eccentrics 308 and are adjusted horizontally by the threads 296 in the bearing 297 into the proper relation with the surface of the glass on which the cutting or ornamentation is to be made. When the machine is set to start an operation, the indexing wheel 77 having a predetermined number notches 204 in its periphery, the number of notches being the number of cuts to be made upon the glass, is on the shaft 75 with the pawl 203 being approximately between two of the notches. The locking lever 159 is in the position disclosed in Fig. 10, that is, with the pin 171 within the slot 82 and the end 172 against the locking cam 113. The hydraulic system operating cam 124 has its high point 125 engaging the roller 222 causing the hydraulic fluid to be forced from the master cylinder 232 through the pipes or flexible conduits P into each of the double acting cylinders 323 which will cause the pin 326 to engage the end 334 of the lever 318 pivoting the entire upper part of the grinding disc carriage on the rod 280 thus causing the grinding disc 288 to be positioned away from the glass which has been previously placed in the chuck.

At this point, the high point of cam 126 is engaging the cam follower block 213 which, through the links 211, has caused the arms 208 to be extended outwardly from the position disclosed in Fig. 11, thus relieving the tension on the springs 220 connected through the rod 342 to the post 340 on the bearing 287 of the grinding disc drive shaft 285.

After all adjustments have been made, as aforesaid, and the glass placed within the chuck, the operator actuates switches 346, 347 and 348 to cause the current to flow to the grinding disc motors 271 and the center unit power mootr 245. After the proper adjustments of speed of each of the grinding discs and the power unit have been determined and adjusted by means of the V-belt pulleys 276 and 253, the operator moves the lever 157 which pivots the locking lever 159 on its pivot 170, withdrawing the pin 171 from the notch 82 of the control wheel 81 and the end of the lever 172 from the cam 113. It will be readily understood that prior to the actuation of the lever 157, although electric motor 245 is driving the gear reduction unit 258, the sprocket wheel 261 is not rotating due to the locking of the center unit by the locking lever 159 and the fact that this locking of the center unit causes the clutch 260 to slip. As soon as the locking lever 159 has been moved in the manner described, the sprocket wheel 261, chain 262 and sprocket wheel 131 are driven by the motor 245 through the gear reductor 258. This driving of the sprocket wheel 131 will turn the shaft 129 and its attendant worm 130, which in turn will drive the worm gear 109, turning shaft 76 and gear 118 thereon. As gear 107, which meshes with gear 118, is not fixed upon the shaft 75, it will slip on the shaft but, as the control wheel 81 has been released, the friction clutch 85 will cause the shaft 75 to rotate thus turning the index wheel 77 until a notch 204 therein is caught by the locking pawl 203. At this point, the glass in the chuck is stationary as the shaft 75 can no longer rotate due to the fact that it is held against rotation by the pawl 203 engaging the notch 204 on the indexing wheel 77 causing the friction clutch 85 to slip even though the gear 107 is constantly rotating. Also, the friction clutch 85 will hold the work against the pull of the grinding discs inasmuch as the grinding discs are revolving in a direction opposite to the direction of rotation of the work when the work is rotated upon release of the pawl 203 from the notches 204 of the indexing wheel 77.

Continued rotation of the shaft 76 will cause the cam wheel 121 and its cam 124 to rotate and release the follower 221 causing the lever 222 to actuate the piston 233 to relieve the pressure on the hydraulic fluid in the pipes or flexible conduits P and double acting cylinders 323. The spring 327 bearing against one of each of the pistons in the double acting cylinders opposite to that one actuating the lever 318 will cause this piston to recede within the cylinder thus forcing the hydraulic fluid back into the system and the master cylinder 232. At this same time, the high point of the cam 126 is beginning to bear upon the follower block 213 forcing the same upwardly causing the arms 208 to retract from their extended position toward the cross piece 67 applying a tension to the spring 220. The hydraulic fluid in the double acting cylinders 323 is working against the tension of the springs 220 so that the grinding discs are brought into engagement with the glass very lightly on first contact and, as the hydraulic fluid recedes from the double acting cylinders 323 and the tension of the springs 220 overcomes the force of the hydraulic fluid, the grinding discs 288 are brought further into contact with the glass thus making the desired cut according to the peripheral surface on the grinding discs. At the present point, the glass is stationary and each of the grinding discs is cutting the desired formation of cut or grind on opposite sides of the glass whether it be in directly opposite points or offset points. At the time of cutting or grinding of the glass, the shaft 76 is continually rotating at a slow speed depending upon the depth of cut desired and the type of cut or ornamentation being placed on the glass.

Also continually rotating with the shaft 76 is the locking cam 113; however, no action is caused by this rotation as the locking lever 159 cannot engage the cam because the control wheel 81 keeps it out of contact through the engagement of the pin 171 with the peripheral surface of the control wheel. When the shaft 76 has completed a part of one revolution, the cam surface 124 begins to engage the follower 221 causing the lever 222 to move the piston 233 in the master cylinder 232 to apply pressure on the hydraulic fluid, which pressure is applied to the double acting cylinders 323. This gradual increase of pressure on the hydraulic fluid until the high point 125 of the cam 124 is reached, gradually withdraws the grinding discs from the surface of the glass so as to finish off the cut or ornamentation made thereon. When the high point of the cam 125 engages the follower 221, the grinding discs have been entirely withdrawn from the surface of the glass and the levers 208 have been released by the low part of the cam 126 so that they fall away from the cross piece 69 thus relieving the tension on the spring 220. At this same point of rotation of the shaft 76, the cam 110 at its high point 179 thereof has engaged the follower block 177 on the slide 174 which forces the slide downwardly as viewed in Fig. 8 which, through the pins 180 and 183 and lever 186 has actuated the pin 192 to withdraw the pawl 203 from the notch 204 in the index wheel 77 thus freeing the index wheel allowing the friction clutch 85 to drive the shaft 75 and turn the index wheel.

At the point of turning of the index wheel, the cam block 177 is released from the cam 176 thus allowing the spring 198 to force the locking pawl 203 downwardly against the peripheral surface of the index wheel 77 and reversely, through the pins, will cause the slide to raise. As soon as the next notch 204 in the index cam has reached the pawl 203, the pawl is forced downwardly into the notch thus locking the index wheel and stopping the friction clutch 85. At this point, with the shaft 76 continually rotating, the hydraulic system operating cam 124 is releasing the lever 222 and the high part of the cam 126 is applying pressure to the follower block 213 to repeat the release of the pressure fluid in the double acting cylinders 323 and apply the tension to the springs 220 as previously described. At this point, the glass or work is stationary due to the locking of the index wheel and the tendency of the slip clutch to turn, which tendency will hold the notches 204 of the index wheel 77 in tight engagement with the locking pawl 203. As has been previously explained, when the locking pawl 203 is removed from one of the notches 204, through the action of the slide cam 177, the slip clutch 85 will rotate the index wheel 77. As soon as the cam 176 has released the slide, the spring 198 will cause the locking pawl 203 to bear against the peripheral surface of the index wheel 77 thereby becoming engaged in the next notch 204 whereupon the clutch 85 will be stopped. However, parts of the clutch 85 are continually rotating from the rotation of the shaft 76, gears 118 and 107, which causes other parts of the slip clutch 85 to try to rotate, thus locking the pawl in the notch. This action insures that the work is held stationary while being worked upon by the tool.

The release of the hydraulic fluid pressure in the double acting cylinders 323 and application of tension to the springs 220 exactly duplicates the action of the skilled glass cutter in applying the glass to the grinding disc by manual action. That is, when the skilled operator is grinding glass to make ornamentation thereon, he first applies the glass to the grinding disc at a very light pressure to begin the cut and as the cut progresses, this pressure is gradually increased until the point where the desired depth of the ornamentation is accomplished. At this time, the skilled operator will gradually withdraw the glass from the grinding disc to finish off the cut. This action is repeated identically in this machine. The gradual release of the hydraulic fluid and the tension of the springs 220 working against each other gradually applies the grinding discs to the stationary glass so that upon initial contact, the cut is begun in the same manner as a skilled worker begins his cut and, as the cut progresses, the pressure of the grinding disc against the glass is increased until the desired depth is obtained and, at this point, the hydraulic fluid takes over and gradually brings the grinding disc away from the glass to finish off the cut. The amount of tension applied to the springs 220 is adjusted by either increasing or decreasing the same by threading the nut 344 upon the rod 342 in either direction.

Thus it will be seen that the index wheel 77 shown in the drawing, which has 12 notches thereon, will cause the shaft 75 to alternately rotate and stop twelve times during the rotation of the index wheel and that this shaft will make one complete revolution while the shaft 76 makes twelve revolutions. As the index wheel makes one complete revolution, the grinding discs are applied to the surface of the glass twelve times thus making twelve cuts about the radial surface of the glass. The index wheel 77 is readily interchangeable and any desired number, either even or uneven, of notches can be placed on its periphery in any manner or form desired. These notches, together with the peripheral surface of the grinding discs control the type of cut and the number of cuts made on the surface of the glass.

Assuming that the glass shown in the chuck in Fig. 6 has twenty-four cuts made thereon and the index wheel 77 is as disclosed in the drawing having twelve notches thereon, there will now be described as to how both discs can make the twenty-four cuts controlled by a twelve notch index wheel. As previously stated, in the usual operation, the axes of the grinding discs 288 should be in horizontal alignment with the axis of the glass. However, in this example, the axes of the two grinding discs are in substantially horizontal alignment but are placed either slightly above or below the axis of the glass. The space between the notches 204 of the index wheel 77 will allow the glass to rotate a distance twice the length of the cut so that each disc will make twelve cuts but the cuts of one disc will be made between the previous cuts made by the other disc without any showing of overlapping between the cuts and will exactly duplicate the hand cutting of a glass by a skilled worker.

As shown in Figs. 18 and 18a of the drawings, there is a glass which has been ornamented by this machine. The upper and lower concentric rings 354 and 355 have been formed by a cutting disc which is complemental to the shape of each of the individual cuts made in forming the ring. In this particular glass, the index wheel 77 has been changed to one containing twenty-four notches on its periphery. The cutting discs 288 have been so adjusted relative to each other that, although their axes are horizontally aligned, with the axis of the glass, one disc is slightly forward of the other disc so that each disc will cut one complete circle as explained above. After the circles have been completely cut, the index wheel 77 is changed to a sixteen notch wheel and one of the grinding discs is rendered inactive by its removal from the glass so that it will not touch the glass during the operation of the machine. The one disc which is still in the cutting position in adjusted axially of the glass so that it will then cut the series of depressions 356 inbetween the two concentric rings, there being sixteen such circular depressions. The same type of disc that cut the rings is not used in making the circular depressions. Therefore, the grinding disc that made the rings is removed from the shaft 285 and the proper disc placed thereon. As an alternative of one disc cutting all sixteen circular depressions, both discs may be used to cut the circular depressions by placing of two like discs on the shafts 285 and removal of the block section 83 from the control disc 81 which will allow the control disc 81 to make a half revolution whereupon the pin 171 will fall into the notch made by removal of the block 83 when forced thereinto by the spring pressed headed pin 165a. Thus, it will be seen that by use of the sixteen notch index wheel 77 and removal of the block 83, each of the grinding discs 288 will make eight of the circular depressions on the glass and, when the glass has made a half revolution, the sixteen circular depressions will have been completed.

The glass shown in Figs. 19 and 19a has a different type of ornamentation thereon which has also been accomplished by this machine. This ornamentation consists of equispaced series of four circular depressions 357 formed into substantially a square, each depression closely adjacent to the next adjoining depressions, there being six of the groups about the surface of the glass. This type of ornamentation requires an indexing wheel of six separate series of two notches in each series, each series being placed approximately 60° apart with the periphery of the index wheel between each series being plain. The two discs are used on opposite sides of the glass, one disc cutting the upper row and the other disc cutting the lower row so that the discs are vertically displaced with respect to each other. As explained in the operation of the machine, each of the discs will cut each circular depression during the time when the index wheel holds the shaft against rotation.

Thus, it will be seen that, through the use of the index wheel 77 having any particular series of clusters of notches cut therein, any desired design can be produced on the glass. Further, by adjustment of the axes of the grinding discs relative to the axis of the glass, any desired type of cut can be made with a particular peripheral surface of the grinding disc. The fact that the grinding discs are interchangeable and the index wheel being interchangeable, the type of cut or ornamentation applied or made in the work piece can be varied at the will of the operator and desire of the public. By not utilizing the indexing means, resilient means and stop cam, an uninterrupted continuous band can be effected on the work. Under such circumstances, the work will be continuously rotated. However, the hydraulic system actuating cam 121 can be rotated at such speeds relative to the speed of rotation of the work holder that it intermittently operates the hydraulic system which in turn intermittently moves the grinding disc or discs to and from the work thus resulting in spaced grinding of the work completely or partially thereabout.

Still further, the control disc 81 may have any number of notches cut therein with all but one filled with a removable block so that the glass may be worked upon by one or both of the grinding discs to reproduce any type of cut or ornamentation desired within the capabilities of the machine.

Once the machine has been set for a particular design with the required indexing wheel and the grinding discs, from that point on, so long as that particular design is being cut, it is only necessary for the operator to place within the chuck the glass or work piece and actuate the lever 157 to start the cutting or grinding operation. The operator need not pay any more attention to the machine until the glass has been completely revolved and the cuts made thereon. Even if the operator should leave the machine for any prolonged period of time, it will make the desired cuts on the work piece and will then stop as far as the cutting of the work piece is concerned although the motors may still be receiving current from the power source. At that time the end of the locking lever 159 engages the cam 113 and the pin 171 is received in the notch 82, all action of the center unit is completely stopped and the grinding discs will not move into engagement with the glass because of the hydraulic fluid being under pressure in the double acting cylinders 323.

The peripheral surfaces of the grinding discs 288 may, of course, be different. One surface of a disc, for instance, may be formed so as to produce a miter cut on the work, glassware or whatever the article or object may be, while the peripheral surface of the other disc may be so formed as to produce a dot effect on the work piece, glassware or whatever the article or object may be. Then, too, the grinding discs 288 may be of different diameter with or without the aforesaid peripheral formations but, nevertheless, the said discs, when in operation, are positioned so that the peripheral surfaces thereof that contact the work are positioned the same distance from the work piece before the grinding or cutting operation is effected.

The timing of the several cams, namely the hydraulic operating cam 124 and the stop cam 113, the control wheel 81, the locking pawl release cam 110 and the tension governing cam 126, plus the positioning of the indexing wheel 77, is important for the proper operation of the center unit to which the work is chucked in combination with the moving of the grinding discs into and out of operation upon the work piece. In other words, the operation of the aforesaid component elements are so synchronized to bring about the proper sequence of operations whereby the cutting or grinding discs or stones are brought to the work to perform the operations thereon by removing some of the surface portions and, likewise, to remove the same from the work. It is understood that the indexing wheel 77 and the various aforementioned cams will result in this indexing means being rotated one notch or tooth at a time simultaneously with removal or withdrawal of the cutting discs from the work and the indexing wheel 77 makes one complete revolution under certain modes of operation and is then stopped by the control wheel 81 which also makes one revolution, and these elements are so timed that when the stop cam 113 engages the locking lever 159, the hydraulic cam 124 is in such a position that the hydraulic system has caused the grinding discs to be removed or withdrawn and held from the work piece.

The eccentrically adjustable stops 335 serve to limit the inward movement of the cutting discs so as to prevent contact of these discs with each other and ruining or destroying the same when, for instance, a glass that has been chucked is for some reason or other broken or that glass or other object otherwise becomes unclutched.

It is obvious that the depth of cut or the amount of the material, be it glass or other material, that is removed is governed by the amount of time a cutting disc or discs engage and perform their functions on the work and also as the result of the speed that the cutting disc or discs are run plus the adjustable tension of the springs 220. This is a rather important feature of the invention in that it serves to compensate for the inherent malformation of the work piece itself, for instance, as in blown glassware, the characteristics of same vary as regards different thicknesses and outer round formation and other defects, etc.

Under certain operating conditions, one may wish to employ a constant pressure of the cutting disc or discs on the glassware or the like rather than the progressive pressure both in and out with respect to the work hereinbefore described. This is readily accomplished by simply locking the two arms 208 together, viz. locking them in a position where they contact opposite parts or cross piece 69 of the frame and hold them together by passing a metal band or any other securing means thereabout.

It is quite obvious that various speeds may be obtained in the use of the present machine, one of which is by substituting different diametered sprocket wheels 131 and 261 and also that different size pulleys 279 and 282 may be utilized.

With respect to the gear drive between gears 107 and 118, of course, various ratios of gears may be used so that the grinding or cutting discs 288 may be held inoperative on the glassware or other articles during the time the article is indexed—intermittently rotated. Furthermore, the ratio of these gears 107 and 118 is changed in accordance with the number of notches or spaces between the notches 204 on the index wheel 77.

While I have disclosed a particular and specific center unit in cooperation with one or both of the grinding or cutting units, this center unit, being removable, may be replaced by a similar one plus features for accomplishing certain functions other than the specific functions recited herein.

What is claimed is:

1. A machine for cutting or grinding surface portions of an article of glassware according to a predetermined design comprising a pair of similarly formed and operated cutting or grinding units, each unit having a rotatable disc carried thereby, hydraulic and resilient means for controlling and operating the movement of the discs away from and toward the glassware respectively, the discs being disposed in spaced adjustable relationship with respect to each other, a center driven unit having means for holding and rotating the work including a base and a frame surmounting same disposed between the two said first units and adjustable with respect to the units, first cam means on the driven unit for controlling and operating the hydraulic means, and second cam means on the driven unit for operating and controlling the resilient means for progressively, according to a predetermined cycle, applying the discs to the work and the said hydraulic means serving to progressively withdraw the discs from the work, means for driving each of the said cutting units for rotating the discs carried thereby, and means for driving the center unit and the component elements operatively connected therewith.

2. In a machine of the character described including operatively connected together rotatable disc cutting means, driven means including means for holding and progressively rotating the work, hydraulic means operatively associated with and operated by the driven means for moving the cutting means relative to the work while the latter is stationary, resilient means associated with and operated by the driven means to progressively apply the cutting means to the work, means for driving the driven means, means for rotating the disc cutting means, and the driven means including the hydraulic means and the resilient means being synchronized so that the disc is progressively applied to the work to perform its function and is progressively removed from the work after completing its function according to a predetermined cycle or cycles of operation.

3. The machine as defined in and by claim 2 wherein there is a cam means associated with the driven means for operating the hydraulic means, and a second cam associated with the driven means for operating the resilient means, the movement of the two cams being so synchronized and controlled that the disc cutting means is progressively applied and removed from the work in performing its function.

4. A machine for ornamenting and cutting glass comprising a pair of rotating cutting discs adapted to be so placed with relation to the glass as to produce designs upon the glass by removing a portion thereof, means for selectively driving the cutting discs, a center driven unit including means for supporting the glass, the driven unit being mounted between the pair of cutting discs, a drive unit for the driven unit, selectable index means on the driven unit for progressively rotating the glass in accordance with a predetermined design, a hydraulic system for moving the discs away from the glass, a cam means on the driven unit and operated thereby to actuate the hydraulic system connected to the cutting discs to progressively remove the cutting discs from the work, resilient means for progressively applying the discs to the glass, a second cam means on the driven unit and operated thereby to control the resilient means connecting the cutting discs to the driven unit to progressively apply the cutting disc to the glass, and holding means operatively associated with the driven unit for engagement with the index means to periodically lock the index means against rotation while the glass is being engaged by the cutting discs, and means mounted on the driven means for periodically actuating the holding means, the indexing means, the locking means, the hydraulic means and the resilient means all being actuated in sequence and synchronism with each other to produce a predetermined design upon the glass.

5. An apparatus of the character described comprising a base, a pair of cutting or grinding units supported in side-by-side spaced relationship, the grinding units comprising cutting discs, a driving means for the cutting discs, and supporting means for the cutting discs, the supporting means being individually and selectively vertically adjustable with respect to the base, the grinding units being so mounted upon the base and having means incorporated in the mounting for horizontally adjusting each unit for selectable positioning of the discs, a center driven unit adjustably mounted on the base between the grinding units, the center unit having means for holding a work piece, a driving means operatively connected with the center unit and laterally offset with respect thereto, and a hydraulic system flexibly connected with the center unit and operated thereby to progressively remove and apply the cutting discs with respect to the work, the adjustments of the grinding units and center unit being so selectable with respect to each other that the peripheral portions of the cutting discs may be preselected and varied so that different designs may be cut into the work, the means for removing and applying the cutting discs to the work comprising a hydraulic system and resilient means respectively, a cam means associated with and operable by the driven means for actuating the hydraulic system connected to the supporting means of the grinding units for progressively removing the cutter discs from the work and a second cam means associated with and operated by the driven unit for operating the resilient means mounted between the supporting means of the grinding unit and the center unit for progressively applying the cutting discs to the work.

6. The apparatus as defined in and by claim 5 wherein the center unit comprises a selectable indexing means for progressively rotating the work while the cutting discs are removed from engagement therewith, and a cam means associated with and operated by the center unit for alternately releasing and locking the indexing means so that the work is held stationary while the cutting discs are being applied thereto.

7. In a machine of the character described, a grinding unit and a work holding unit, the grinding unit comprising a bed plate, a rotatable grinding disc and swingable support therefor, a driving means for the disc and all operatively connected together and fixedly mounted on the bed plate, the work holding unit comprising a work holder and a driving means therefor, a stationary support for the grinding unit and work unit, cooperable means for maintaining the bed plate fixed relative to the support and for allowing adjusting movements thereof relative to the support so as to vary the position and angularity of the grinding disc with respect to the work, hydraulically operated means operatively connected with the grinding disc support so as to allow for said adjustment of the entire unit as such relative to the support, means operated by the work holding unit and including a flexible conduit connected with the hydraulically operated means for operating the same whereby the hydraulically operated means moves the grinding disc away from the work on the fixed adjusted unit, and means for moving the grinding disc toward the work.

8. In a machine of the character described comprising spaced substantially similarly formed grinding units with a work holding unit positioned therebetween and including means for rotating the work, each of the grinding units having a rotatable grinding disc embodied therein and means for rotating the discs, a support for the said units, the said grinding units being so mounted with respect to the support so as to be adjustable and thus allowing for adjustment of one unit relative to the other unit so as to dispose the grinding discs at the same or different angular positions relative to each other and to the work, means for moving the grinding disc toward the work, and hydraulically operated means connected with each grinding disc, means for operating the hydraulic means so that the grinding discs are moved away from the work held by the work holding unit.

9. A machine as defined in and by claim 8 wherein the hydraulic means includes a flexible conduit operatively connected with each of the grinding units, and which conduit is movable when the adjustment of one or both of the grinding units is made.

10. The machine as defined in and by claim 9 wherein the work holding unit that is positioned between the grinding units is adjustable horizontally relative to the grinding units.

11. Apparatus of the character described comprising a base, a pair of cutting units supported in side-by-side spaced relationship, the cutting units comprising cutting discs, a driving means for the cutting discs, and supporting means for the cutting discs, the supporting means being movable toward and away from each other, a center unit mounted on the base between said cutting units, the center unit having means for holding a work piece, the center unit also having a rotatable shaft journalled thereon, first and second cam means on said shaft, drive means operatively connected to said shaft, a hydraulic pump actuated by the first cam means, a hydraulic motor connected with said supporting means for the cutting discs, a fluid line connecting said hydraulic pump and said hydraulic motor whereby said discs are moved away from each other when the pump is actuated by the first cam means, resilient means connected to said supporting means, means connected to said resilient means for moving said discs toward each other and actuated by said second cam means to alternately increase the decrease the force applied by the resilient means on the supporting means, said first and second cam means being so correlated on said shaft that the force applied by the resilient means progressively decreases as the hydraulic system moves the discs apart and progressively increases as the high point of the first cam means passes in point of actuation with the hydraulic pump.

12. Apparatus of the character described comprising a pair of similarly formed and operated cutting units each having a rotatable disc movably carried thereby, a center unit mounted between said cutting units and having means connected therewith for holding work, first and second cam means carried by said center unit, drive means operatively connected to said first and second cam means, hydraulic means including mechanism engaged by said first cam means for moving said grinding discs away from each other and from work held by said center unit, resilient means including mechanism engaged by said second cam means for moving said cutting discs toward each other and into engagement with work held by the center unit.

13. Apparatus of the character described comprising a base, a pair of similarly formed cutting units adjustably mounted in spaced relation on said base, each cutting unit including a cutting disc, drive means for the cutting disc, movable support means for the cutting disc, and a fluid motor for moving the support means, a center unit adjustably mounted on the base between the cutting units, the center unit having means for holding a work piece in presentation for engagement by said cutting discs and drive means for cyclically indexing the work holding means, the last mentioned drive means including mechanism for connecting said fluid motors to a source of fluid under pressure in synchronization with the indexing of the work holding means, the said mechanism of the center unit being connected to the fluid motors of the cutting units by means of flexible fluid lines whereby all of the units are independently adjustable on the base.

14. Apparatus of the character described comprising a base, a center unit adjustably mounted on said base, said center unit having means for holding a work piece and drive means for cyclically indexing the work holding means, a pair of similarly formed cutting units adjustably mounted on said base on opposite sides of the center unit, each cutting unit including a cutting disc, movable support means for the cutting discs, resilient means normally urging the cutting discs toward said work holding means to engage a work piece held thereby, hydraulic means connected to the support means in opposition to the resilient means for moving the cutting discs away from a work piece, and drive means for rotating the cutting discs, the center unit drive means including mechanism for actuating said hydraulic means in synchronization with the indexing of the work piece, said mechanism being connected to said hydraulic means by flexible conduits whereby all of the units are independently adjustable on said base.

15. In a machine of the character described, a grinding unit, a work holding unit and a support for both units, said grinding unit including a bed plate mounted on said support for fixed adjusted positions thereon, a grinding disc support swingably mounted on the bed plate for movement toward and away from the work holding unit, a grinding disc rotatably carried by said grinding disc support for swinging movement into and out of engagement with work held by said work holding unit, a hydraulic motor mounted on said bed plate and connected to said grinding disc support to swing the grinding disc away from the work holding unit and out of engagement with the work held thereby, means for urging said grinding disc support toward said work holding unit to engage the grinding disc against the work, and drive means on the bed plate for rotating the grinding disc, said work holding unit including a horizontally rotatable work holder, drive means for cyclically indexing said work holder, a hydraulic pump connected to said hydraulic motor and actuated by the last mentioned drive means to swing said grinding disc out of engagement with the work prior to indexing of the work holder, the connection between the hydraulic pump of the work holding unit and the hydraulic motor of the grinding unit comprising flexible conduit means to flexibly accommodate for relative movement between the grinding and work holding units and being the sole operative connection between such units whereby the grinding unit is adjustable independently of the work holding unit.

16. In a machine of the character described, a grinding unit, a work holding unit and a support for both units, said grinding unit including a bed plate mounted on said support for fixed adjusted positions about a vertical axis, a grinding disc support swingably mounted on the bed plate for movement about a horizontal axis, a grinding disc rotatably carried by said grinding disc support and swingable therewith into and out of engagement with work held by said work holding unit, a hydraulic motor mounted on said bed plate and connected to said grinding disc support to swing the grinding disc away from the work holding unit and out of engagement with the work held thereby, means for urging said grinding disc support toward said work holding unit to engage the grinding disc against the work, and drive means on the bed plate for rotating the grinding disc; said work holding unit including a horizontally rotatable work holder, drive means for cyclically indexing the work holder, a hydraulic pump connected to said hydraulic motor and actuated by the last mentioned drive means to swing said grinding disc out of engagement with the work prior to indexing of the work holder, the connection between the hydraulic pump of the work holding unit and the hydraulic motor of the grinding unit comprising flexible conduit means to flexibly accommodate for relative movement between the grinding and work holding units and being the sole operative connection between such units whereby the grinding unit is adjustable about its vertical axis independently of the work holding unit.

17. In a machine of the character described, a grinding unit, a work holding unit and a base for mounting both units, said units being mounted in side-by-side relation on said base and at least one of said units being adjustably mounted on the base for movement relative to the other unit, said work holding unit including a work holder, drive means connected to the work holder for cyclically indexing the same, and a hydraulic energizing means connected to the drive means and intermittently actuated thereby in timed relation to the indexing of the work holder, said grinding unit including a rotatable grinding disc, means for rotating said grinding disc, and means for moving the grinding disc into and out of engagement with work held by said work holder, the last means including a hydraulic motor, and flexible conduit means interconnecting said hydraulic energizing means and said hydraulic motor, said flexible conduit means being of sufficient length to allow for relative adjusted movement between the units and constituting the sole operative interconnection therebetween.

18. In a machine of the character described, a grinding unit, a work holding unit and a base for mounting both units, said units being mounted in side-by-side relation on the base, said work holding unit including a work holder, and drive means connected to the work holder for cyclically indexing the same; said grinding unit including a rotatable grinding disc, means for rotating said grinding disc, and means for moving the grinding disc into and out of engagement with work held by said work holder, said grinding unit being adjustably mounted on the base for movement relative to said work holding unit to vary the angle of intersection between the grinding disc and work held by the work holder, and the last means including hydraulic mechanism connected with said grinding disc for moving the same, hydraulic energizing means connected to and actuated by the driving means of said work holding unit and intermittently actuated thereby in timed relation to indexing of the work holder, and flexible conduit means interconnecting the hydraulic energizing means and the hydraulic motor.

19. In a machine of the character described, a grinding unit, a work holding unit and a base for mounting both units, said units being mounted in side-by-side relation on the base, said work holding unit including a work holder, and drive means connected to the work holder for cyclically indexing the same; said grinding unit including a rotatable grinding disc, means for rotating said grinding disc, and means for moving the grinding disc into and out of engagement with work held by said work holder, said grinding unit being adjustably mounted on the base for movement relative to said work holding unit to vary the angle of intersection between the grinding disc and work held by the work holder, and the last means including hydraulic mechanism connected with said grinding disc for moving the same, hydraulic energizing means connected to and actuated by the driving means of said work holding unit and intermittently actuated thereby in timed relation to indexing of the work holder, and flexible conduit means interconnecting the hydraulic energizing means and the hydraulic motor, and means for moving said work holding unit in a direction axially of the rotational movement of said work holder.

20. In a machine for cutting glassware and the like, a grinding unit and a work holding unit, the grinding unit comprising a bed plate, a rotatable grinding disc and a swingable support therefor, a driving means for the disc and all operatively connected together and fixedly mounted on the bed plate, the work holding unit comprising a work holder and a driving means for indexing the work holder, a stationary support for the grinding unit and work unit, at least one of said units being adjustably mounted on said support relative to the other unit, said work holding unit also including hydraulic means actuated by the driving means for the work holding unit in timed relation to indexing of the work holder, said grinding unit also including hydraulically actuated means connected to said grinding disc support for swinging the grinding disc away from the work held by said work holding unit, flexible conduit means connecting said hydraulic means and said hydraulically actuated means to permit relative adjustment between the two units while still maintaining connection between the hydraulic means and the hydraulically actuated means, and means for moving the grinding disc toward the work.

21. In a machine for grinding glassware and the like, a grinding unit and work holding unit, the grinding unit comprising a bed plate, a rotatable grinding disc and swingable support therefor, a driving means for the disc and all operatively connected together and fixedly mounted on the bed plate, the work holding unit comprising a work holder and a driving means for cyclically indexing the work holder, a stationary support for the grinding unit and the work unit, cooperable means for maintaining the bed plate fixed relative to the support and for allowing adjustment movements thereof relative to the support so as to vary the position and angularity of the grinding disc with respect to the work, hydraulically operated means mounted on said bed plate and connected to the grinding disc support for moving the grinding disc away from the work held by said work holding unit, means mounted on the work holding unit and actuated by the driving means therefor in timed relation to indexing of the work holder, flexible conduit means connecting the last means and the hydraulically operated means to permit the aforementioned adjusting movements of the grinding unit with respect to the work holding unit while maintaining an operable connection to the hydraulically operated means, and means for moving the grinding disc toward the work.

22. In a machine for grinding glassware and the like, a grinding unit and a work holding unit, each of said units being independently mounted upon a common support and at least one of said units being adjustably mounted on the support for movement relative to the other unit, the grinding unit including a rotatable grinding disc swingably mounted for movement toward and away from work held by said work holding unit and driving means for rotating said disc, the work holding unit including a work holder and driving means for cyclically indexing a work piece held by the work holder, said grinding unit also including fluid motor means for swinging said disc away from the work, said work holding unit also including fluid pumping means actuated by the driving means for the work holding unit in timed relation to indexing of the work piece, means normally urging said grinding disc toward the work, and conduit means interconnecting said fluid pump and said fluid motor to permit the aforementioned relative adjustment and movement between the individual units while still maintaining connection between said fluid pump means and said fluid motor means.

References Cited in the file of this patent

UNITED STATES PATENTS

| | | |
|---|---|---|
| 747,428 | Hubbuch | Dec. 22, 1903 |
| 1,615,978 | Greer | Feb. 1, 1927 |
| 1,650,345 | Greer | Nov. 22, 1927 |
| 1,650,375 | Milliken | Nov. 22, 1927 |
| 1,677,484 | Milliken | July 17, 1928 |
| 1,899,654 | Ward | Feb. 28, 1933 |
| 1,925,384 | Hoern | Sept. 5, 1933 |
| 2,027,726 | Fletcher | Jan. 14, 1936 |
| 2,097,135 | Schutz | Oct. 26, 1937 |
| 2,215,369 | Gabriel | Sept. 7, 1940 |
| 2,643,583 | Miller | June 30, 1953 |

FOREIGN PATENTS

| | | |
|---|---|---|
| 13,857 | Great Britain | June 16, 1913 |
| 738,260 | Germany | Aug. 13, 1943 |